(12) United States Patent
Takano et al.

(10) Patent No.: US 10,372,827 B2
(45) Date of Patent: Aug. 6, 2019

(54) TRANSLATING PHRASES FROM IMAGE DATA ON A GUI

(71) Applicant: INTERNATIONAL BUSINESS MACHINES CORPORATION, Armonk, NY (US)

(72) Inventors: Sawa Takano, Tokyo (JP); Tadayuki Yoshida, Yokohama (JP)

(73) Assignee: International Business Machines Corporation, Armonk, NY (US)

( * ) Notice: Subject to any disclaimer, the term of this patent is extended or adjusted under 35 U.S.C. 154(b) by 364 days.

(21) Appl. No.: 14/045,545

(22) Filed: Oct. 3, 2013

(65) Prior Publication Data

US 2014/0122054 A1     May 1, 2014

(30) Foreign Application Priority Data

Oct. 31, 2012   (JP) ................................. 2012-239982

(51) Int. Cl.
*G06F 17/28* (2006.01)
*G06F 9/451* (2018.01)

(52) U.S. Cl.
CPC .......... *G06F 17/2809* (2013.01); *G06F 9/454* (2018.02); *G06F 17/289* (2013.01)

(58) Field of Classification Search
CPC .................................................... G06F 17/289
See application file for complete search history.

(56) References Cited

U.S. PATENT DOCUMENTS

| | | | | |
|---|---|---|---|---|
| 5,801,699 A | * | 9/1998 | Hockey | G06F 3/04817 715/781 |
| 5,974,372 A | * | 10/1999 | Barnes et al. | 704/8 |
| 6,323,884 B1 | * | 11/2001 | Bird et al. | 715/810 |
| 6,426,761 B1 | * | 7/2002 | Kanevsky | G06F 3/0481 715/764 |
| 7,752,572 B1 | * | 7/2010 | Shahrbabaki et al. | 715/817 |
| 2002/0064316 A1 | * | 5/2002 | Takaoka | 382/305 |
| 2002/0099456 A1 | * | 7/2002 | McLean | H04L 12/2805 700/83 |

(Continued)

FOREIGN PATENT DOCUMENTS

| | | |
|---|---|---|
| JP | 05-094472 | 4/1993 |
| JP | 06-035955 | 2/1994 |

(Continued)

*Primary Examiner* — Bryan S Blankenagel
(74) *Attorney, Agent, or Firm* — Law Office of Jim Boice

(57) ABSTRACT

A method, system, and/or computer program product translates a phrase in a first language to an equivalent phrase in a second language. Electronic data includes image data, which describes one or more graphical user interface (GUI) elements on a GUI. The GUI includes a delineated area that is used by a GUI element. The GUI element is matched to one of a plurality of predefined GUI elements, where each of the plurality of predefined GUI elements is predefined by a set of data that comprises a conditional expression, which describes a structure of a particular GUI element, as well as a type of text data that is associated with that particular GUI element. Text data from the delineated area in the GUI is then translated from the first language into the second language according to the type of text data that is associated with a particular type of GUI element.

19 Claims, 33 Drawing Sheets

(56) References Cited

U.S. PATENT DOCUMENTS

| | | | |
|---|---|---|---|
| 2002/0173946 A1* | 11/2002 | Christy | G06F 17/2872 704/2 |
| 2004/0167768 A1* | 8/2004 | Travieso et al. | 704/2 |
| 2004/0207658 A1* | 10/2004 | Awada | G06F 9/451 715/747 |
| 2006/0036964 A1* | 2/2006 | Satterfield | G06F 3/0481 715/777 |
| 2007/0140539 A1* | 6/2007 | Katsumata | A61B 1/0676 382/128 |
| 2007/0174782 A1* | 7/2007 | Russo | G06F 3/04817 715/781 |
| 2008/0163119 A1* | 7/2008 | Kim | G06F 3/04886 715/840 |
| 2008/0172637 A1* | 7/2008 | Chang et al. | 715/846 |
| 2009/0070697 A1* | 3/2009 | LaForest | H04L 41/22 715/772 |
| 2010/0050112 A1* | 2/2010 | Chiu et al. | 715/781 |
| 2010/0057438 A1* | 3/2010 | Zhanyi et al. | 704/4 |
| 2011/0074574 A1* | 3/2011 | Becker et al. | 340/540 |
| 2011/0148909 A1* | 6/2011 | Besley | G06T 1/00 345/592 |
| 2011/0161077 A1* | 6/2011 | Bielby | 704/231 |
| 2011/0231432 A1 | 9/2011 | Sata et al. | |
| 2012/0016655 A1* | 1/2012 | Travieso et al. | 704/2 |
| 2012/0155754 A1* | 6/2012 | Chen | G06K 9/00456 382/164 |
| 2012/0198547 A1* | 8/2012 | Fredette | G06F 8/34 726/19 |
| 2012/0311426 A1* | 12/2012 | Desai | G06F 17/2705 715/227 |
| 2013/0060559 A1* | 3/2013 | Ryu | G06F 17/289 704/3 |
| 2014/0026166 A1* | 1/2014 | Jeong | H04N 21/4756 725/47 |
| 2014/0076475 A1* | 3/2014 | Galicia | G06F 17/289 156/64 |
| 2015/0019991 A1* | 1/2015 | Kristj Nsson | H04L 41/0853 715/747 |

FOREIGN PATENT DOCUMENTS

| | | |
|---|---|---|
| JP | 07-105214 | 4/1995 |
| JP | 09-179865 | 7/1997 |
| JP | 10-049534 | 2/1998 |
| JP | 11-232275 | 8/1999 |
| JP | 11-272669 | 10/1999 |
| JP | 2002-091966 | 3/2002 |
| JP | 2005-025380 | 1/2005 |
| JP | 2005-316830 | 11/2005 |
| JP | 2007-052700 | 3/2007 |
| JP | 2010-033160 | 2/2010 |

* cited by examiner

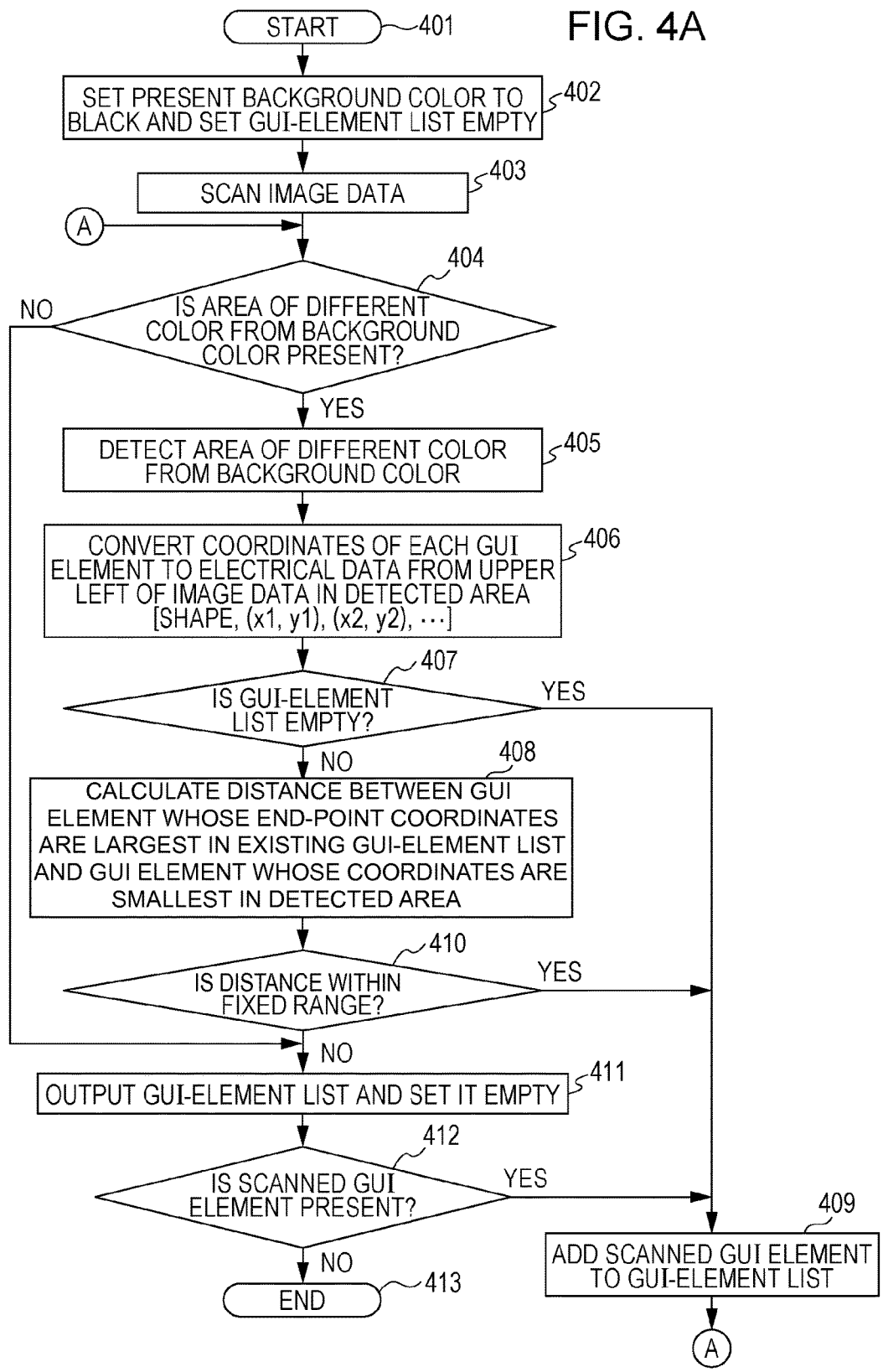

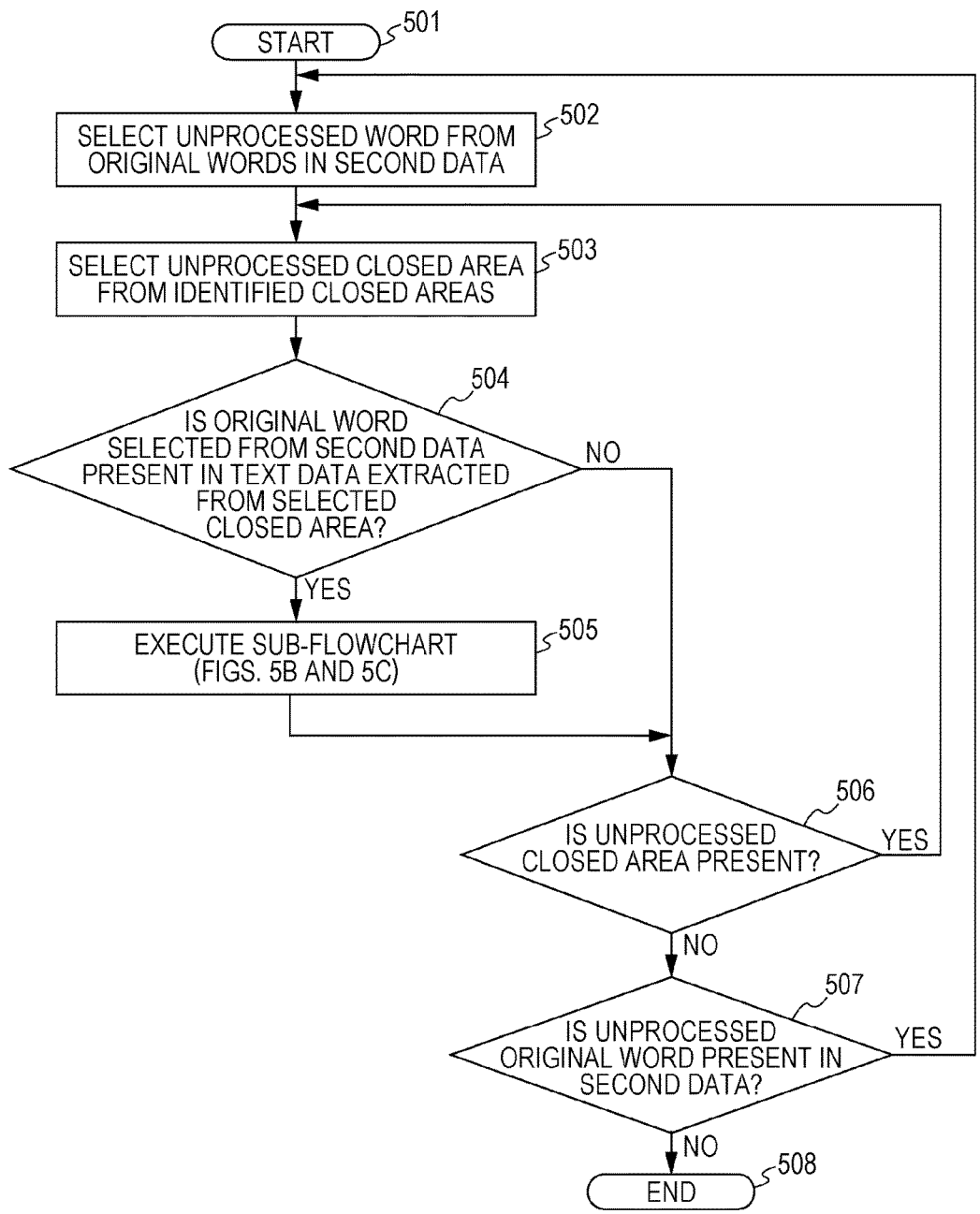

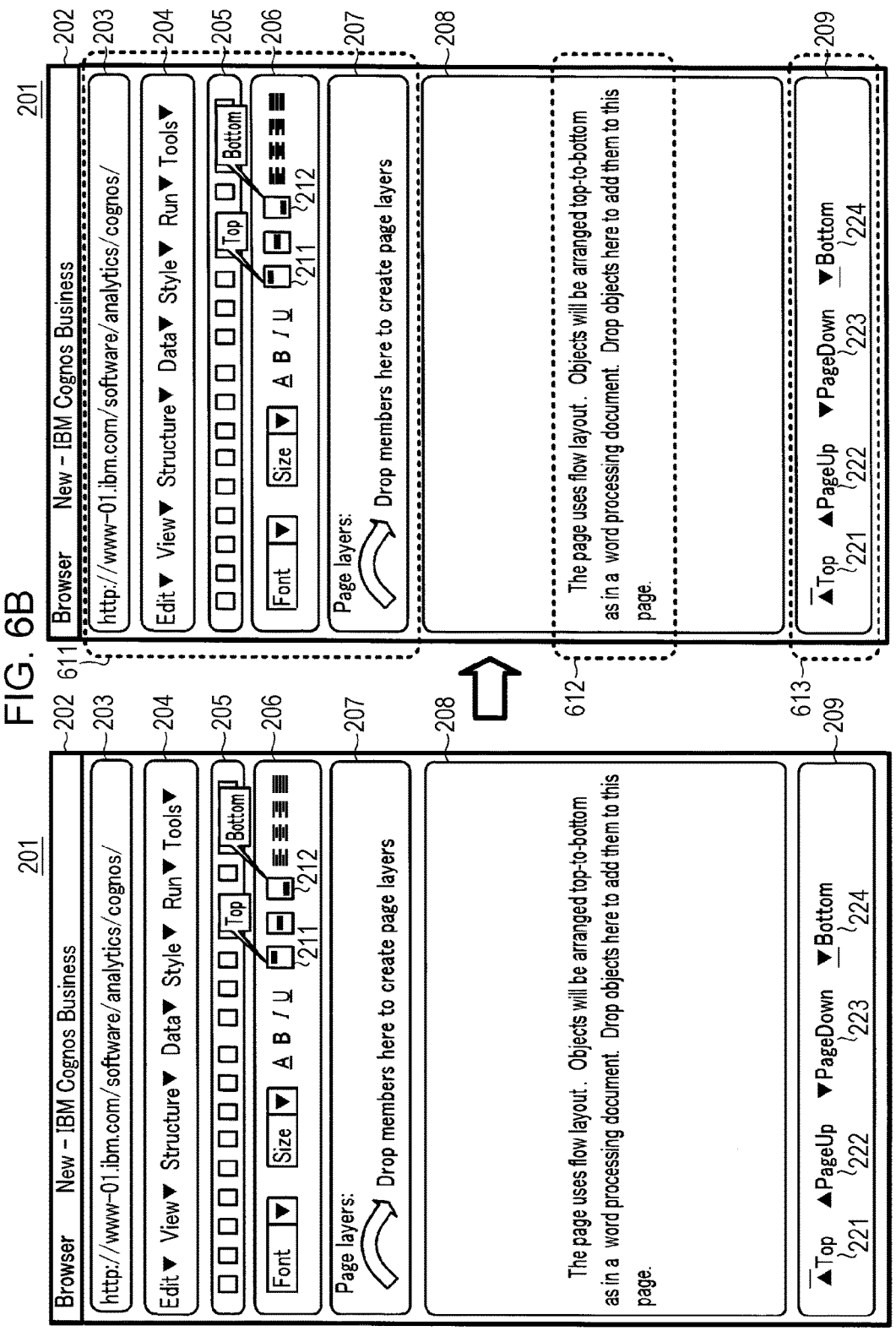

A. BACKGROUND COLOR B10 — 701

C11 = [RECTANGULAR, (50,70), (300,90)]
C12 = [RECTANGULAR, (100,100), (140,110)]
C13 = [RECTANGULAR, (150,100), (190,110)]
C14 = [RECTANGULAR, (200,100), (260,110)]
...

A. TERMINATION PHASE L = {C11, C12, ⋯, C18}

B. BACKGROUND COLOR B20 — 702

C19 = [RECTANGULAR, (20,140), (50,170)]
...

B. TERMINATION PHASE L = {C11, C12, ⋯, C18, C19, C20, ⋯, C36}

C. BACKGROUND COLOR B30 — 703

C37 = [RECTANGULAR, (20,170), (180,190)]
...

C. TERMINATION PHASE L = {C11, C12, ⋯, C18, C19, C20, ⋯, C36, C37, C38, ⋯, C48}

D. BACKGROUND COLOR B40 — 704

C49 = [RECTANGULAR, (30,210), (90,220)]
...

D. TERMINATION PHASE L = {C11, C12, ⋯, C18, C19, C20, ⋯, C36, C37, C38, ⋯, C48, C49, C50, C51}

FIG. 7B
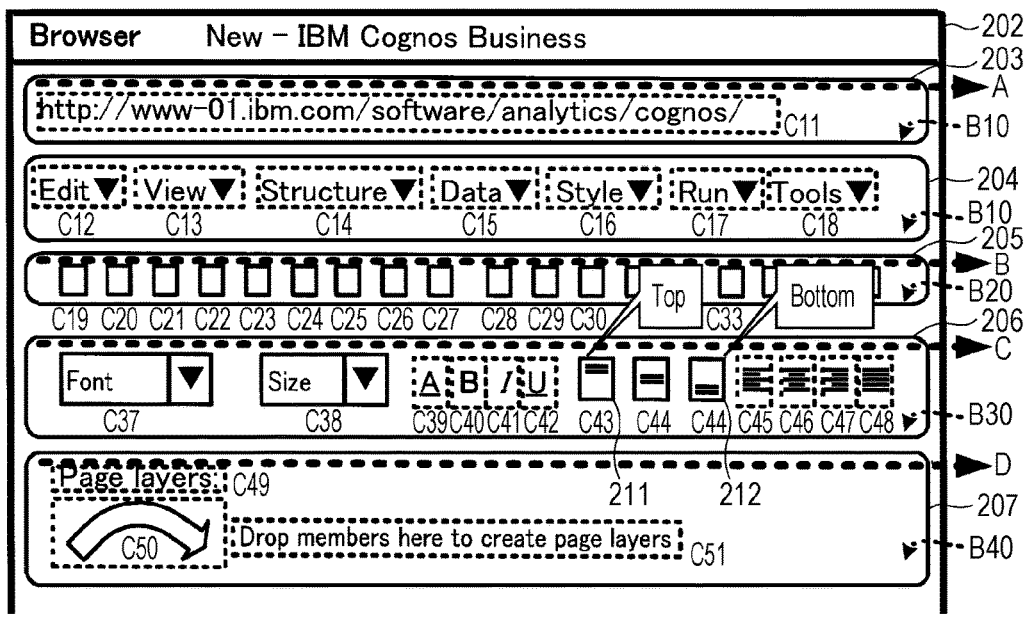
RECTANGULAR AREA LIST L={}
A. BACKGROUND COLOR B10 — 701
C11=[RECTANGULAR, (50,70), (300,90)]
C12=[RECTANGULAR, (100,100), (140,110)]
C13=[RECTANGULAR, (150,100), (190,110)]
C14=[RECTANGULAR, (200,100), (260,110)]
...
A. TERMINATION PHASE L={C11, C12, ···, C18}
B. BACKGROUND COLOR B20 — 702
C19=[RECTANGULAR, (20,140), (50,170)]
...
B. TERMINATION PHASE L={C11, C12, ···, C18, C19, C20, ···, C36}
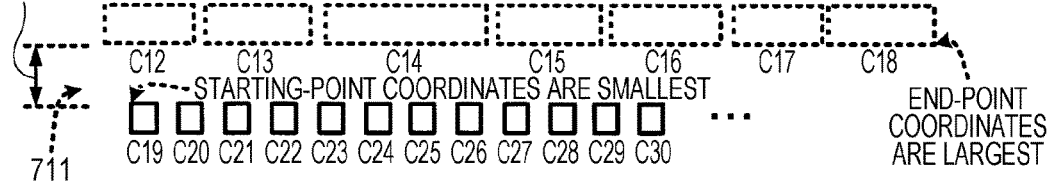

| CONDITIONAL EXPRESSION FOR STRUCTURE OF GUI ELEMENT (SCREEN STRUCTURE) | GUI-ELEMENT GROUP NAME (SCREEN-AREA CATEGORY NAME) | WEIGHTING INFORMATION |
|---|---|---|
| 811 — SEVEN GUI ELEMENTS OF SAME SIZE ARE ARRANGED | SCHEDULE | 50 |
| 812 — LANDSCAPE GUI ELEMENTS, LARGE RECTANGULAR GUI ELEMENTS, AND SIX OR MORE GUI ELEMENT OF SAME SIZE ARE ARRANGED REGULARLY | EMAIL, EDITOR, REPORT | 15 |
| 813 — EIGHT OR MORE GUI ELEMENTS OF SAME SIZE ARE ARRANGED REGULARLY | TOOLBOX | 50 |
| 814 — FOUR LANDSCAPE GUI ELEMENTS ARE ARRANGED | MOVE PAGE | 25 |

{
IF SEVEN GUI ELEMENTS OF SAME SIZE ARE ARRANGED, THEN GUI-ELEMENT GROUP NAME IS "SCHEDULE" ~831

ELSE IF LANDSCAPE GUI ELEMENTS, LARGE RECTANGULAR GUI ELEMENTS, AND SIX OR MORE ~832
GUI ELEMENT OF SAME SIZE ARE ARRANGED, REGULARLY
THEN GUI-ELEMENT GROUP NAME IS "EMAIL, EDITOR, REPORT"

ELSE IF EIGHT OR MORE GUI ELEMENTS OF SAME SIZE ARE ARRANGED REGULARLY, ~833
THEN GUI-ELEMENT GROUP NAME IS "TOOL BOX"

ELSE IF FOUR LANDSCAPE GUI ELEMENTS ARE ARRANGED, ~834
THEN GUI-ELEMENT GROUP NAME IS "MOVE PAGE"
}

FIG. 8C

SEVEN GUI ELEMENTS OF SAME SIZE ARE ARRANGED

PROCEDURE 1: OBTAIN SEVEN CONTINUOUS RECTANGLES
CONDITION 1: AREAS OF SEVEN RECTANGLES ARE SUBSTANTIALLY EQUAL
PROCEDURE 2: SET COORDINATES OF FIRST RECTANGLE TO (sx1, sy1) (sx2, sy2)
SET COORDINATES OF SEVENTH RECTANGLE TO (ex1, ey1) (ex2, ey2)
CONDITION 2: "sy1 AND ey1 ARE SUBSTANTIALLY EQUAL" AND "sy2 AND ey2 ARE SUBSTANTIALLY EQUAL"
CONDITION 3: PROCEDURE 1 TO CONDITION 2 HOLD FOUR TIMES OR MORE

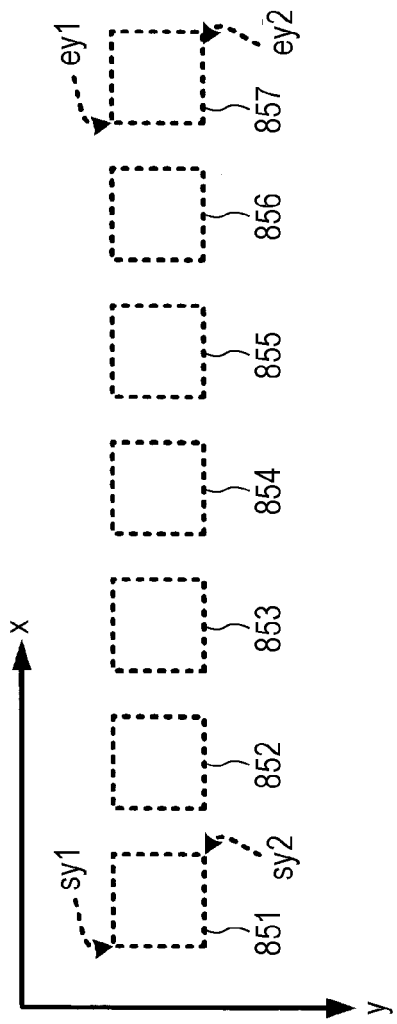

FIG. 10A

| ENGLISH TO BE TRANSLATED | PERIPHERAL TERM | POINT | TRANSLATION CANDIDATE |
|---|---|---|---|
| Top | move, page, jump, go, previous, next, up, down, bottom | 1 | 最初の頁 |
| | toolbox, center, left, right, justify, justification, align, horizon, vertical, margin, object, paragraph, middle, bottom | 1 | 上詰め |
| Bottom | move, page, jump, go, previous, next, up, down, top | 1 | 最後の頁 |
| | toolbox, center, left, right, justify, justification, align, horizon, vertical, margin, object, paragraph, middle, top | 1 | 下詰め |

| ENGLISH TO BE TRANSLATED | PERIPHERAL TERM | WEIGHTING INFORMATION | TRANSLATION CANDIDATE |
|---|---|---|---|
| Top | move, page, jump, go, previous, next, up, down, bottom | 5 | 最初の頁 |
|  | toolbox, center, left, right, justify, justification, align, horizon, vertical, margin, object, paragraph, middle, bottom | 8 | 上詰め |
| Bottom | move, page, jump, go, previous, next, up, down, top | 10 | 最後の頁 |
|  | toolbox, center, left, right, justify, justification, align, horizon, vertical, margin, object, paragraph, middle, top | 15 | 下詰め |

Edit  View  Structure  Data  Style  Run  Tools
New Open Edit Cut Copy Paste Delete Undo Redo
......
Font Size Color Underline  Bold Italic  Left Center
Right Top Center Bottom Fill
......
Page layers:

1001

| ENGLISH TO BE TRANSLATED | PERIPHERAL TERM | POINT | TRANSLATION CANDIDATE |
|---|---|---|---|
| Top | move, page, jump, go, previous, next, up, down, bottom | 1 | 最初の頁 |
| | toolbox, center, left, right, justify, justification, align, horizon, vertical, margin, object, paragraph, middle, bottom | 1 | 上詰め |

1011, 1012, 1013

FIG. 11B
AREA A = GUI-ELEMENT GROUP NAME = TOOLBOX

```
Edit  View  Structure  Data  Style  Run  Tools         — 901
New Open Edit Cut Copy Paste Delete Undo Redo
.....
Font Size Color Underline  Bold Italic  Left Center
Right Top Center Bottom Fill
.....
Page layers:
```

1001

| ENGLISH TO BE TRANSLATED | PERIPHERAL TERM | POINT | TRANSLATION CANDIDATE |
|---|---|---|---|
| Top | move, page, jump, go, previous, next, up, down, bottom | 1 | 最初の頁 |
|  | toolbox, center, left, right, justify, justification, align, horizon, vertical, margin, object, paragraph, middle, bottom | 1 | 上詰め |

1011 ... 1012 ... 1013

| ENGLISH TO BE TRANSLATED | PERIPHERAL TERM | POINT | TRANSLATION CANDIDATE |
|---|---|---|---|
| Top | move, page, jump, go, previous, next, up, down, bottom | 1 | 最初の頁 |
| Top | toolbox, center, left, right, justify, justification, align, horizon, vertical, margin, object, paragraph, middle, bottom | 1 | 上詰め |

Top Page Up Page Down Bottom

FIG. 11D

AREA C = GUI-ELEMENT GROUP NAME = MOVE PAGE

Top Page Up Page Down Bottom    ~903

1001

| ENGLISH TO BE TRANSLATED | PERIPHERAL TERM | POINT | TRANSLATION CANDIDATE |
|---|---|---|---|
| Top | move, page, jump, go, previous, next, up, down, bottom | 1 | 最初の頁 |
|  | toolbox, center, left, right, justify, justification, align, horizon, vertical, margin, object, paragraph, middle, bottom | 1 | 上詰め |

Edit View Structure Data Style Run Tools
New Open Edit Cut Copy Paste Delete Undo Redo
....
Font Size Color Underline Bold Italic Left Center
Right Top Center Bottom Fill
....
Page layers:

1031

| ENGLISH TO BE TRANSLATED | PERIPHERAL TERM | WEIGHTING INFORMATION | TRANSLATION CANDIDATE |
|---|---|---|---|
| Top | move, page, jump, go, previous, next, up, down, bottom | 5 | 最初の頁 |
| | toolbox, center, left, right, justify, justification, align, horizon, vertical, margin, object, paragraph, middle, bottom | 8 | 上詰め |

AREA A = GUI-ELEMENT GROUP NAME = TOOLBOX
(WEIGHTING INFORMATION 50)

```
Edit  View  Structure  Data  Style  Run  Tools
New Open Edit Cut Copy Paste Delete Undo Redo
...
Font Size Color Underline  Bold Italic  Left Center
Right Top Center Bottom Fill
...
Page layers:
```
901

| ENGLISH TO BE TRANSLATED | PERIPHERAL TERM | WEIGHTING INFORMATION | TRANSLATION CANDIDATE |
|---|---|---|---|
| Top | move, page, jump, go, previous, next, up, down, bottom | 5 | 最初の頁 |
| | toolbox, center, left, right, justify, justification, align, horizon, vertical, margin, object, paragraph, middle, bottom | 8 | 上詰め |

AREA C = GUI-ELEMENT GROUP NAME = MOVE PAGE
(WEIGHTING INFORMATION 25)

Top Page Up Page Down Bottom    903

1031

| ENGLISH TO BE TRANSLATED | PERIPHERAL TERM | WEIGHTING INFORMATION | TRANSLATION CANDIDATE |
|---|---|---|---|
| Top | move, page, jump, go, previous, next, up, down, bottom | 10 | 最初の頁 |
|  | toolbox, center, left, right, justify, justification, align, horizon, vertical, margin, object, paragraph, middle, bottom | 15 | 上詰め |

| ENGLISH | PERIPHERAL TERM | TRANSLATION CANDIDATE |
|---|---|---|
| to | value, maximum, minimum | 最大 |
| | period, second, hour, day, week, year, month, date, start, find, search, range | 終了 |
| | name, forward, subject, cc, bcc, inbox, folder, mail, send, draft, save, reply, delivery, notification, message | 宛先 |
| from | value, maximum, minimum | 最小 |
| | period, second, hour, day, week, year, month, date, start, find, search, range | 開始 |
| | name, forward, subject, cc, bcc, inbox, folder, mail, send, draft, save, reply, delivery, notification, message | 差出人 |
| second | millisecond, second, minute, hour, day, time, watch | 秒 |
| | first, third, fourth, fifth | 二番 |
| up | top, bottom, ascend, descend, order, sort | 上 |
| | run, idle, fail, failure, between, service, status, success | 稼働中 |
| down | top, bottom, ascend, descend, order, sort | 下 |
| | run, idle, fail, failure, between, service, status, success | 停止中 |
| division | multiplication, addition, subtraction, total | 除算 |
| | Corporation, member, team, department | 部門 |
| minute | millisecond, second, minute, hour, day, time, watch | 分 |
| | meeting, document, level | 議事録 |
| round | rectangular, sphere, cube, chart, graph | 円 |
| | absolute, value, difference, min, max, median, roll, average, total | 四捨五入 |

FIG. 16A

TRANSLATING PHRASES FROM IMAGE DATA ON A GUI

This application is based on and claims the benefit of priority from Japan (JP) Patent Application 2012-239982, filed on Oct. 31, 2012, and herein incorporated by reference in its entirety.

BACKGROUND

The present invention relates to a technique for determining a translation equivalent to a word or a phrase to be translated to different words or phrases in image data. In particular, the present invention relates to a method for determining a suitable translation equivalent to a word or a phrase from among a plurality of translation candidates.

In the case where one word is to be translated to another language, if there are a plurality of translation equivalents to the one word, it is appropriate to translate the one word into different words depending on the context, situation, and so on. When performing the above one-to-many translation, the translator needs to select a suitable translation equivalent to the one word with reference to a sentence including the one word, with reference to peripheral terms within about upper and lower ten lines including the one word, or with reference to a screen on which the one word is displayed.

In the case where a translator translates a screen of computer software that uses a graphical user interface (hereinafter also referred to as a GUI) or a document including the screen (hereinafter referred to as a GUI image document) or in the case where a client asks an outside translator to translate the GUI image document, the translator or the client sometimes list specific words in the GUI image document in advance and determine translation equivalents to the specific words from among a plurality of words. However, the specific words are sometimes sorted in alphabetical order in the list. In the case where the specific words are sorted in alphabetical order, the relationship between the specific words and peripheral terms thereof is lost, which makes it difficult for the translator or the client to perform one-to-many translation of the specific words.

A method in which translation software selects a suitable translation equivalent is roughly divided into, for example, a method of one-to-many translation based on semantic information on the subject, object, and predicate and a method of one-to-many translation depending on the field of a sentence to be translated. For example, the former method is effective in translating novels and letters, and the latter method is effective in translating manuals and scientific and technical sentences. Since the main targets of existing translation software are manuals and scientific and technical sentences, the latter method undergoes further improvements to improve the quality of translations. However, in the case where translation software translates a specific word in the GUI image document, it is still difficult to translate the specific word to suitable different words by the present methods.

In the prior art, a machine translation system executes translation processing using a computer, a suitable-translation-equivalent selection method for selecting the most suitable translation equivalent from a plurality of translation equivalent candidates for a word Tj in an input original, if present. That is, prior art discloses that the machine translation system comprises a co-occurrence dictionary and a suitable-translation-equivalent selection unit that executes a suitable-translation-equivalent selection process for selecting a suitable translation equivalent from a plurality of translation candidates by using the co-occurrence dictionary. The co-occurrence dictionary is configured such that words that appear together with each of entry words in a source language are set as co-occurring words, and an evaluation value K indicates the degree of appearance of each entry word together with each co-occurring word is described for each co-occurring word. In the suitable-translation-equivalent selection process of the suitable-translation-equivalent selection unit, co-occurring words for each translation candidate are looked up by using the co-occurrence dictionary. It is determined whether a co-occurrence-related word, in which the co-occurring word itself is a translation equivalent candidate, is present in the original word that is to be translated. If a co-occurrence-related word is present, an evaluation value Vi indicating the degree of use of the translation candidate as a suitable translation equivalent is calculated for each translation candidate, in consideration of the position and the number of times of appearance of the co-occurrence-related word for the word Tj in the original, for which a suitable translation equivalent is to be given, and the evaluation value K of the co-occurring word in the co-occurrence dictionary, and a translation candidate i whose evaluation value Vi is the largest is selected as a suitable translation equivalent to the word Tj from the plurality of translation candidates for the word Tj in the original.

Other prior art discloses a machine translator that performs natural language processing. Such prior art teaches a machine translator that comprises translation-target-area-selection-information storage means that stores information for selecting a translation target area in a document in a source language and translation-target-area determination means that determines a translation target area on the basis of the information stored in the storage means; a translation result can be quickly presented by translating only a specific area determined on the basis of the information serving as a key for selecting the translation target area.

Still yet other prior art teaches a machine translator and a computer-readable storage medium in which a machine-translation processing program is stored. In particular, such other prior art discloses a technique for appropriately translating a sentence expressed using an idiomatic expression and a sentence other than that in different manner.

Still yet other prior art teaches a machine translator, and in particular, a machine translator that translates a fixed-form sentence by using a method of searching a table in which translations corresponding to such fixed-form sentences are stored.

Still yet other prior art teaches a machine translator that translates a first language to a second language by using both normal translation processing using a translation dictionary and fixed-form-sentence processing using a fixed-form sentence dictionary.

Still yet other prior art teaches a natural language translator that translates natural languages using a computer.

Still yet other prior art teaches an apparatus, method, and program for supporting communication between persons who speak in different languages.

Still yet other prior art teaches a natural language analysis unit, and in particular, it discloses a natural language analysis unit that performs machine translation, such as natural language analysis processing.

Still yet other prior art teaches a machine translator and a machine translation program for translating sentences in a first language, such as English, to sentences in a second language, such as Japanese. Such other prior art also provides a machine translator and a machine translation program in which the possibility that words in a character string obtained by keying an original or capturing a Web page with a scanner are detected as unknown words or ungrammatical sentences is reduced when machine-translated, and thus the translation accuracy and operating efficiency can be improved.

Still yet other prior art teaches an information processing unit that, when receiving a keyword as an input, outputs a content corresponding to the keyword, and a method for the same, and in particular, it discloses an information processing unit, such as an electronic dictionary or a translator that displays an example sentence and a translation thereof, and an information processing method using the information processing unit.

Still yet other prior art teaches a machine-translation support unit that supports post-processing of the translation result of a machine translator and a method for the same.

Still yet other prior art teaches a natural-language recognition process, and in particular, it discloses a natural-language processing unit that executes a process corresponding to the semantic content of a sentence in a natural language, and a method and program for the same.

SUMMARY

A method, system, and/or computer program product translates a phrase in a first language to an equivalent phrase in a second language. Electronic data includes image data, which describes one or more graphical user interface (GUI) elements on a GUI. The GUI includes a delineated area that is used by a GUI element. The GUI element is matched to one of a plurality of predefined GUI elements, where each of the plurality of predefined GUI elements is predefined by a set of data that comprises a conditional expression, which describes a structure of a particular GUI element, as well as a type of text data that is associated with that particular GUI element. Text data from the delineated area in the GUI is then translated from the first language into the second language according to the type of text data that is associated with a particular type of GUI element.

BRIEF DESCRIPTION OF THE SEVERAL VIEWS OF THE DRAWINGS

FIG. 4A shows a flowchart for the process of identifying closed areas in image data and GUI elements in the closed areas of the steps of the flowchart shown in FIG. 3;

FIG. 5A is a flowchart, of the steps of the flowchart shown in FIG. 3, for the process of selecting a suitable translation equivalent to one word or phrase in image data from a plurality of translation candidates in second data;

FIG. 6B shows that closed areas are identified on the web screen data shown in FIG. 2A in accordance with an embodiment of the present invention;

FIG. 7B shows obtaining the distance between a GUI element whose end-point coordinates are the largest in a closed area list and a GUI element whose starting-point coordinates are the smallest in GUI elements detected by scanning when identifying closed areas on the web screen data shown in FIG. 2A in accordance with an embodiment of the present invention;

FIG. 8A shows a GUI-element-group DB, which is an embodiment of the first data that can be used in an embodiment of the present invention;

FIG. 8B shows a schematically programmed process of steps 423 to 427 shown in FIG. 4B, showing examples of conditional expressions for the structures of GUI elements in the first data, which can be used in an embodiment of the present invention;

FIG. 8C shows an example of conditional expressions for the structure of GUI elements in the first data, which can be used in an embodiment of the present invention;

FIG. 10A shows a translation candidates database, which is an embodiment of the second data that can be used in an embodiment of the present invention;

FIG. 10B shows a translation candidates database, which is an embodiment of the second data that can be used in an embodiment of the present invention;

FIG. 11A shows an example in which extracted text data and peripheral terms associated with two translation candidates are individually compared to find the number of matched words for the individual translation candidates in order to select a suitable translation equivalent by using the translation candidates database shown in FIG. 10A in accordance with an embodiment of the present invention;

FIG. 11B shows an example in which extracted text data and text data associated with GUI-element groups are individually compared with peripheral terms associated with two translation candidates to find the number of matched words for the individual translation candidates in order to select a suitable translation equivalent by using the translation candidates database shown in FIG. 10A in accordance with an embodiment of the present invention;

FIG. 11D shows an example in which extracted text data and text data associated with a GUI-element group are individually compared with peripheral terms that are individually associated with two translation candidates to find the number of matched words for the individual translation candidates in order to select a suitable translation equivalent by using the translation candidates database shown in FIG. 10A in accordance with an embodiment of the present invention;

FIG. 12A shows an example in which extracted text data and peripheral terms associated with two translation candidates are individually compared to find values (weighted values) obtained from the numbers of matched words for the individual translation candidates in order to select a suitable translation equivalent by using the translation candidates database shown in FIG. 10B in accordance with an embodiment of the present invention;

FIG. 12B shows an example in which extracted text data and text data associated with a GUI-element group are compared with peripheral terms that are individually associated with two translation candidates to find values (weighted values) obtained from the numbers of matched words for the individual translation candidates in order to select a suitable translation equivalent by using the translation candidates database shown in FIG. 10B in accordance with an embodiment of the present invention;

FIG. 12D shows an example in which extracted text data and text data associated with a GUI-element group are compared with peripheral terms that are individually associated with two translation candidates to find values (weighted values) obtained from the number of matched words for the individual translation candidates in order to select a suitable translation equivalent by using the translation candidates database shown in FIG. 10B in accordance with an embodiment of the present invention;

FIG. 14 shows an example of a translation candidates DB that can be used in an embodiment of the present invention, in which original words whose first language is English are translated to different words in accordance with an embodiment of the present invention;

FIG. 16A shows that English "From/To" in a calendar screen should be translated to "開始日時／終了日時" not to "差出人／宛先"

DETAILED DESCRIPTION

Embodiments of the present invention will be described herein with reference to the drawings. The same reference sign denotes the same object in all of the drawings unless otherwise noted. It should be understood that the embodiments of the present invention are merely for describing preferred forms of the present invention and are not intended to limit the scope of the present invention.

Figure 1:
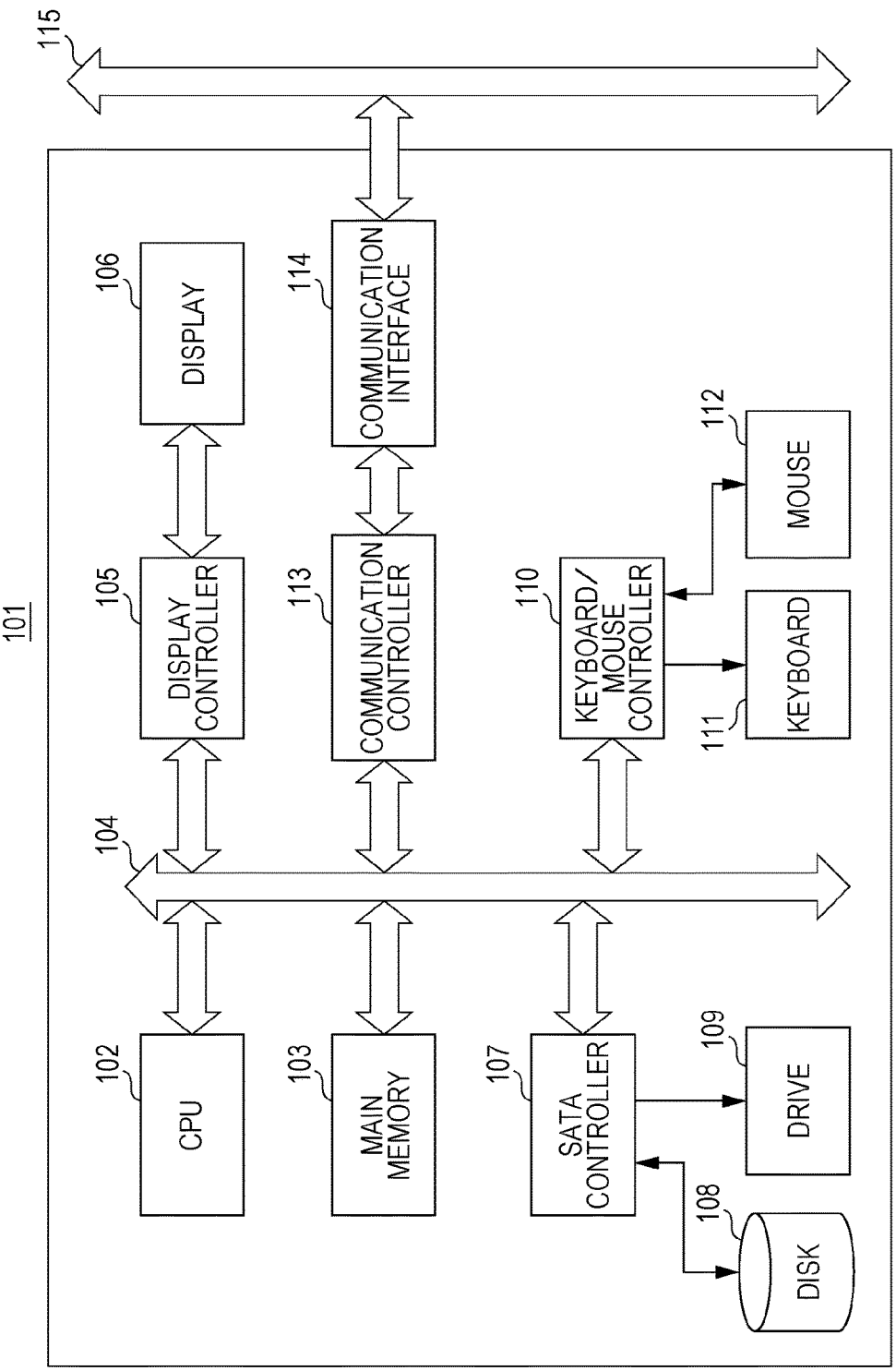
FIG. 1 is a diagram showing an example of a hardware configuration for implementing a computer according to an embodiment of the present invention.

FIG. 1 is a diagram showing an example of a hardware configuration for implementing a computer according to an embodiment of the present invention.

A computer 101 includes a central processing unit (CPU) 102 and a main memory 103, which are connected to a bus 104. The CPU 102 is preferably based on a 32-bit or 64-bit architecture. Examples include CPUs include, but are not limited to, Core i™ series, Core 2™ series, Atom™ series, Xeon™ series, Pentium® series, and Celeron® series of Intel Corporation, A series, Phenom™ series, Athlon™ series, Turion™ series, and Sempron™ of AMD, Inc., A series of Apple Inc.®, and CPUs for Android terminals. The bus 104 can connect to a display 106, such as a liquid crystal display (LCD), a touch liquid crystal display, or a multitouch liquid crystal display, via a display controller 105. The display 106 can be used to display information, which is displayed when software, for example, a computer program according to the present invention, operates in the computer 101 via an appropriate graphic interface. The bus 104 can also connect to a disk 108, such as a hard disk or a silicon disk, and a drive 109, such as a CD, a DVD, or a BD drive, via an SATA or IDE controller 107. The bus 104 can further connect to a keyboard 111 and a mouse 112 via a keyboard/mouse controller 110 or a USB bus (not shown).

The disk 108 can store an operating system, such as Windows® OS, UNIX® OS, Mac OS®, or smart phone OS™, programs for providing a Java® processing environment, a Java® application, a Java® virtual machine (VM), and a Java® Just-In-Time (JIT) compiler, other programs, and data so as to be loaded in the main memory 103.

The drive 109 can be used to install programs to the disk 108 from a CD-ROM, a DVD-ROM or a BD.

A communication interface 114 conforms to, for example, an Ethernet® protocol. The communication interface 114 is connected to the bus 104 via a communication controller 113 and plays the role of physically connecting the computer 101 to a communication line 115 and provides a network interface layer for a TCP/IP communication protocol, which is the communication function of the operating system of the computer 101. The communication line 115 can be a wired LAN environment, or a wireless LAN environment based on a wireless LAN connection standard, such as IEEE802.11a/b/g/n.

The computer 101 can be a personal computer, such as a desktop computer, a notebook computer, or a cloud terminal, a tablet terminal, or a personal digital assistant, but is not limited thereto.

Figure 2A:
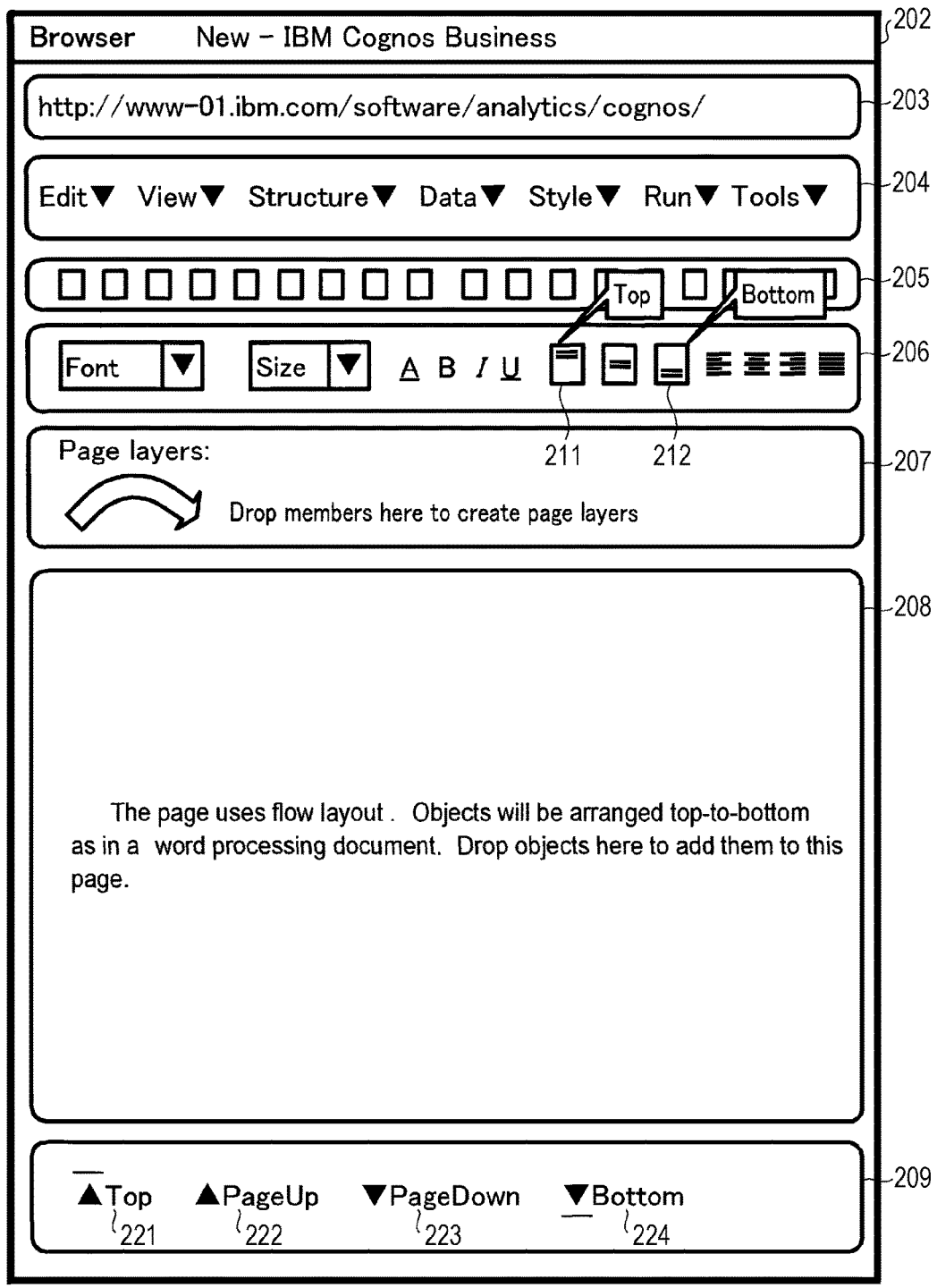
FIG. 2A shows an example of web screen data to be translated, which can be used in an embodiment of the present invention.

FIG. 2A shows an example of web screen data to be translated, which can be used in an embodiment of the present invention.

The web screen data shown in FIG. 2A can be entire image data or part thereof. In the case where the entire web screen data shown in FIG. 2A is image data, the web screen data can be data stored in Joint Photographic Experts Group (JPEG), Graphics Interchange Format (GIF), Portable Network Graphics (PNG), bitmap (BMP), or Portable Document Format (PDF) format. In the case where part of the web screen data shown in FIG. 2A is image data, the web screen data can be data stored in HyperText Markup Language (HTML) format, and the HTML data can be image data that can be displayed using, for example, <img> tag. In the case where part of the web screen data shown in FIG. 2A is image data, the image data can be a Graphical User Interface (GUI) element. Examples of the GUI element include a label, an input area, an icon, a menu bar, an area of a specific shape (for example, a rectangular, polygonal, or circular area) The label is a GUI element that describes an input area before or behind an input area. Examples of the label include "Name:" in a name input field and "Keyword:" in a search input field. The input area is an area in which characters can be input. The icon is a drawing or picture of the content of a program for easier understanding. By the user moving a cursor onto an icon and clicking a pointing device (for example, a mouse or a track ball) or by touching, with a finger, the screen of a display unit on which the icon is displayed, a function associated with the icon can be called, or the program can be started.

The web screen data shown in FIG. 2A includes a title bar 202, a Uniform Resource Locator (URL) input area 203, a menu bar 204, icons 205, input areas for character font or size setting and icons for character modification or format setting, 206, a setting area 207 for page layout, an entry field 208 for characters and so on, and icons 209 for page moving.

The web screen data shown in FIG. 2A also displays a balloon help (a character string "Top") of the icon 211 and a balloon help (a character string "Bottom") of the icon 212. The balloon helps can be displayed by, for example, placing a pointing device on the icons 211 and 212. That is, "Top" in icon 211 has a different contextual meaning than "Top" in icon 221, just at "Bottom" in icon 212 has a different contextual meaning than "Bottom" in icon 224. The present invention therefore provides the appropriate Japanese translation based on these contextual differences.

Thus, in the example of the web screen data shown in FIG. 2A, it is necessary to translate the balloon help (the character string "Top") of the icon 211 and the character string "Top" 221 of the icon 209 for page moving and the balloon help (the character string "Bottom") of the icon 212 and the character string "Bottom" 224 of the icon 209 for page moving. Specifically, "Top" needs to be properly translated to "上詰め" or "最初の頁", and "Bottom" needs to be properly translated to "下詰め" or "最後の頁", depending on the words "Top" and "Bottom" are used on the GUI.

Figure 2B:
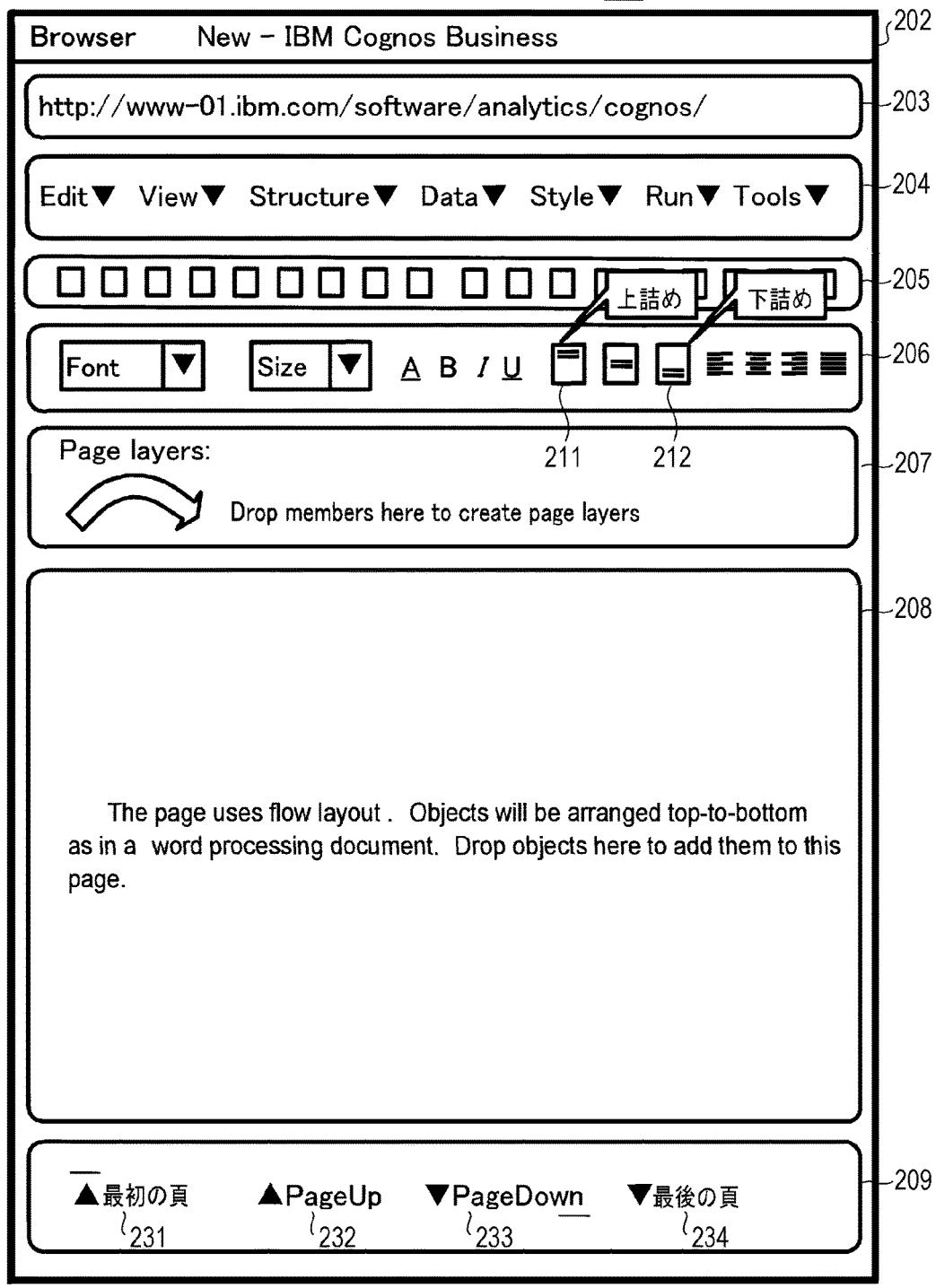
FIG. 2B shows an example of the result of translation of words in the web screen data shown in FIG. 2A in accordance with an embodiment of the present invention.

FIG. 2B shows an example of the result of translation of words in the web screen data shown in FIG. 2A in accordance with an embodiment of the present invention.

According to the embodiment of the present invention, the balloon help (character string "Top") of the icon 211 is translated to "上詰め", and the character string "Top" 221 of the icon 209 for page moving is translated to "最初の頁" 231.

Furthermore, according to the embodiment of the present invention, the balloon help (character string "Bottom") of the icon 212 is translated to "下詰め", and the character string "Bottom" 224 of the icon 209 for page moving is translated to "最後の頁" 234.

As described above, according to the embodiment of the present invention, the words in the web screen data shown in FIG. 2A are translated to suitable translation equivalents.

FIG. 3 to FIG. 5C show examples of flowcharts for the one-to-many translation according to an embodiment of the present invention.

Figure 3:
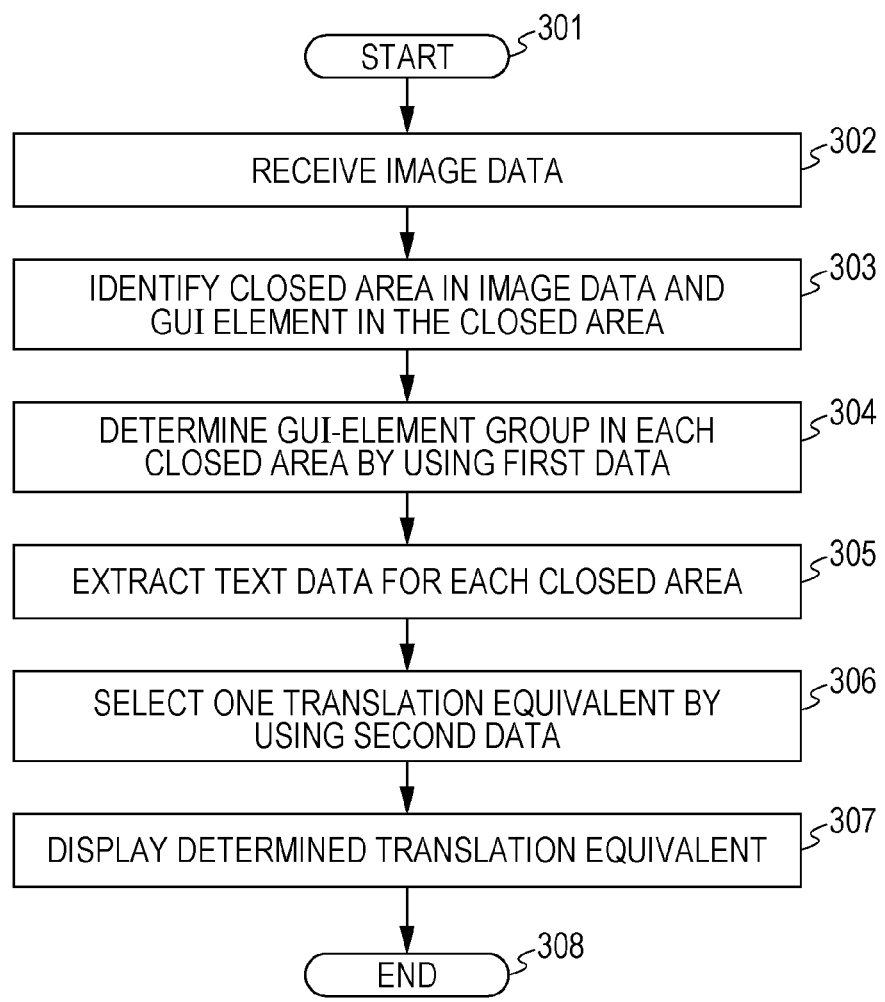
FIG. 3 is a flowchart for translating a word or a phrase in a first language to a suitable translation equivalent in a second language in accordance with an embodiment of the present invention.

FIG. 3 is a flowchart for translating a word or a phrase in a first language to a suitable translation equivalent in a second language in accordance with an embodiment of the present invention.

In step 301, the computer 101 starts the process of translating a word or a phrase in the first language to a translation equivalent in the second language. In the example shown in FIGS. 2A and 2B, although the first language is English, and the second language is Japanese, the first language and the second language are not limited to specific languages and are not particularly limited provided that the second language has a plurality of translation equivalents to a word or a phrase in the first language. The first language may be a first dialect in a certain language, and the second language may be a second dialect in the same language.

In step 302, the computer 101 receives image data or electronic data including image data into the main memory 103 or the disk 108. The image data can be obtained by an image reading unit (for example, a scanner) connected to the computer 101 converting data printed on paper into image data in electronic form, by converting electronic data into image data with application software that converts electronic data into image data (for example, Adobe Acrobat® series of Adobe Systems Incorporated, or application software having a compatible function therefor), or by converting a screen or an active window on a display unit into image data. The image data can be data stored in, for example, the JPEG, GIF, PNG, or BMP format, or in the PDF format. The electronic data including image data can be obtained as electronic data including image data (for example, an electronic file) inserted or embedded in a document of word processor software, spreadsheet software, or presentation software. The computer 101 can obtain image data or electronic data including image data from a storage unit of another computer or the communication line 115 via a storage device connectable to the computer 101 or via the communication line 115 (for example, the Internet or an intranet).

In step 303, the computer 101 can identify at least one or more closed areas in the image data or the electronic data including image data, received in step 302, and at least one or more GUI elements in the closed area by scanning the image data or the electronic data including image data. Alternatively, the identification of at least one or more closed areas in the image data or the electronic data including image data received in step 302 may be performed by the user trailing, for example, a pointing device or a user's finger on the screen of the display unit so as to form a closed area or by enlarging or reducing the shape of the closed area serving as a template with a pointing device or a user's finger. After the at least one or more closed areas (i.e., delineated/enclosed/defined/selected areas) are identified by the user, the computer 101 can further identify a GUI element in the identified closed areas. Example of the closed area can include a rectangular area, a circular area, an elliptical area, and a polygonal area (for example, a star-shaped area). Thus, the term "closed area" is defined as a delineated area on a GUI, which includes any geometric shaped area on the GUI that is selected by a user and/or computer logic. The processing details of step 303 will be described below with reference to the flowchart in FIG. 4A. An example of scanning of the image data or the electronic data including image data will be described below with reference to the description in FIG. 6A. An example of image data in which closed areas are identified will be described below with reference to the description in FIG. 6B. A specific example in which GUI elements in closed areas are identified will be described below with reference to the description in FIG. 7A. A specific example in which closed areas in image data or electronic data including image data are identified will be described below with reference to the description in FIG. 7B.

In step 304, the computer 101 determines a GUI-element group (also referred to as "screen area category") of each closed area in response to identification of closed areas and GUI elements in step 303. When determining a GUI-element group in each closed area, the computer 101 uses first data (for example, "a GUI-element-group DB" 801 in FIG. 8A) for use in determining a GUI-element group. The first data includes, as a set of data, at least one conditional expression for the structure of a GUI element in image data and text data associated with at least one GUI-element group associated with the conditional expression. The processing details of step 304 will be described below with reference to the flowchart in FIG. 4B. The details of the content of the first data will be described below with reference to a specific example of the first data shown in FIGS. 8A to 8C.

In step 305, the computer 101 extracts text data for each closed area identified in step 303. The extraction of the text data can be performed, for image data, by processing text in the image data with optical character reading means (for example, OCR software). As another embodiment, in the case where text displayed, for example, in a balloon, on a GUI element (for example, balloon help (text) associated with an icon is present in image data, the computer 101 can extract the text as text data by processing the text with optical character reading means (for example, OCR software). For electronic data including image data, the computer 101 can extract text data embedded in the electronic data by reading the text data from the electronic data. For example, in the case where electronic data associated with a GUI element is present, the computer 101 can extract text data associated with the GUI element from the electronic data. The computer 101 can execute step 305 before or at the same time as step 304. An example of the text data extracted in step 305 will be described below with reference to a specific example in FIG. 9.

In step 306, the computer 101 determines whether second data for use in translating a word or a phrase in the first language (hereinafter also referred to as "original word") present in second data, for example, "translation candidates database" (hereinafter also referred to as "translation candidates DB") 1001 shown in FIG. 10A for use in translating a word or a phrase in the first language to an equivalent in the second language, is present in the text data extracted in step 305. In response that the original word in the second data is present in the text data extracted in step 305, the computer 101 selects a translation equivalent of the word present in the text data from a plurality of translation candidates associated with the original word in the second data. The processing details of step 306 will be described below with reference to the flowcharts in FIGS. 5A to 5C. The details of the content of the second data will be described below with reference to specific examples shown in FIGS. 10A and 10B. Specific examples of determination whether the original word in the translation candidates database 1001 is present in the text data extracted in step 305 will be described below with reference to specific examples shown in FIGS. 11A to 11D and FIGS. 12A to 12D.

In step 307, the computer 101 can display the word selected in step 306 on, for example, a display unit, as a determined translation equivalent. An example of displaying the determined translation equivalent on the display unit will be described below with reference to a specific example shown in FIG. 13.

In step 308, in response to completion of determination of a translation equivalent in step 307, the computer 101 terminates the process of translating a word or a phrase in the first language to a translation equivalent to the second language.

FIG. 4A shows a flowchart for the process of identifying closed areas in image data and GUI elements in the closed areas of the steps of the flowchart shown in FIG. 3.

In step 401, the computer 101 starts the process of identifying closed areas in image data and GUI elements in the closed areas.

In step 402, before starting scanning of image data or electronic data including image data, the computer 101 sets the default of the present background color to be black. The default is set to black so that, when the computer 101 detects a background color other than black in image data or electronic data including image data during scanning, the computer 101 can recognize an area having a background color other than black. Before starting scanning of image data or electronic data including image data, the computer 101 sets a GUI-element list in which GUI elements in one closed area are listed empty.

Figure 6A:
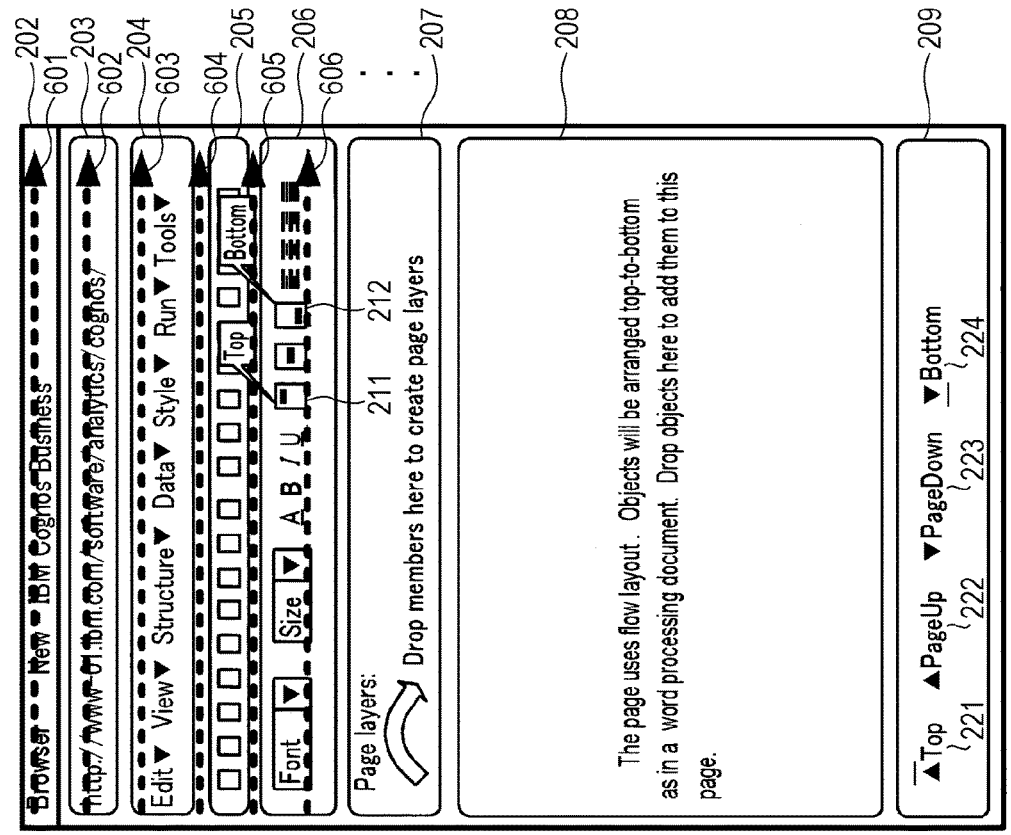
FIG. 6A shows scanning on the web screen data shown in FIG. 2A in accordance with an embodiment of the present invention.

In step 403, the computer 101 starts scanning of image data or electronic data including image data. The scanning can be performed, as shown in FIG. 6A, for example, by repeating scanning of image data or electronic data including image data from a left end to a right end, and after reaching the right end, moving the scanning to directly below the scanned area, and scanning from a left end to a right end (601, 602, 603, 604, 605, 606, . . . ).

In step 404, the computer 101 determines during the scanning whether an area having a color different from the present background color is present. If an area having a color different from the present background color is present, the computer 101 advances the process to step 405. If an area having a color different from the present background color is not present, the computer 101 advances the process to step 411. The determination whether the area has a color different from the present background color is made on the basis of RGB values. If there is a fixed difference or more between the RGB values, the computer 101 determines that the area has a color different from the present background color. Any value can be set by the user for the fixed difference or more.

In step 405, in response to the fact an area having a color different from the present background color is present, the computer 101 detects the area having a color different from the present background color on the image data or the electronic data including image data. In contrast, in step 411, in response to the fact an area having a color different from the present background color is not present, the computer 101 outputs the present GUI-element list and sets the GUI-element list empty. By outputting the present GUI-element list, a GUI-element list in which GUI elements in a certain closed area are listed is created. By setting the GUI-element list empty, a new closed area in the image data or the electronic data including image data can be searched for in steps 404 to 411.

In step 406, the computer 101 converts the coordinates of the individual GUI elements in the detected area into electronic form from the upper left of the image data. Examples of the converted coordinates are as follows:

[shape,(x1, y1),(x2, y2), . . . ]

By converting the coordinates of the individual GUI elements into electronic form, a list of scanned GUI elements in the detected area is created.

In step 407, the computer 101 determines whether the GUI-element list is empty. If the GUI-element list is not empty, the computer 101 advances the process to step 408. If the GUI-element list is empty, the computer 101 advances the process to step 409.

In step 408, in response to the fact that the GUI-element list is not empty, the computer 101 calculates the distance between a GUI element whose end-point coordinates are the largest in the existing GUI-element list and a GUI element whose starting-point coordinates are the smallest of the scanned GUI elements in the detected area. The distance is in a direction perpendicular to the scanning direction of the image data (see reference sign 711 in FIG. 7B). The distance is obtained to determine whether to form a new closed area or not by combining (or joining) the detected area and one closed area including a GUI element in the existing GUI-element list. In contrast, in step 409, in response to the fact that the GUI-element list is empty, the computer 101 adds a scanned GUI element in the detected area to the GUI-element list. The addition of the GUI element present in the detected area means that the detected area and one closed area including GUI elements in the existing GUI-element list are combined (or joined) to form a new closed area. The computer 101 returns the process to step 404 after adding the scanned GUI element to the GUI-element list.

In step 410, the computer 101 determines whether the distance obtained in step 408 is within a fixed range. If the distance is not within the fixed range, the computer 101 advances the process to step 411. If the distance is within the fixed range, the computer 101 advances the process to step 409.

The fixed range can be designated, for example, in units of pixels. For example, if the distance is less than 50 pixels, the computer 101 combines the detected area and a closed area including GUI elements present in the existing GUI-element list to form a new closed area. For example, if the distance is 50 pixels or more, the computer 101 determines that the detected area and a closed area including GUI elements present in the existing GUI-element list are different closed areas and identifies the other closed area as a new closed area. The fixed range does not need to be based on an absolute reference and can be changed as appropriate depending on whether how the user wants to identify a closed area (i.e., how the user wants to localize a closed area). In other words, whether the user sets the range of a closed area in detail, or conversely, roughly, depends on the discretion of the user. This means that, even if the number of pixels of image data increases in future to increase an area necessary for one closed area, an area to be combined as one closed area can be designated appropriate by the user increasing the fixed range as the number of pixels increases.

In step 411, in response to the fact that the distance is not within the fixed range, the computer 101 outputs the present GUI-element list and sets the GUI-element list empty. By outputting the GUI-element list, a GUI-element list in which GUI elements in a closed area are listed is created. By setting the GUI-element list empty, a new closed area in the image data or the electronic data including image data is searched for in steps 404 to 411.

In step 412, the computer 101 determines whether a scanned GUI element is present. If a scanned GUI element is present, the computer 101 advances the process to step 409. In contrast, if a scanned GUI element is not present, the computer 101 advances the process to the termination process in step 413.

In step 409, in response to the fact that a scanned GUI element is present, the computer 101 adds the scanned GUI element in the detected area to the GUI-element list. After adding the scanned GUI element to the GUI-element list, the computer 101 returns the process to step 404.

In step 413, the computer 101 terminates the process of identifying a closed area in image data and a GUI element in the closed area.

The flowchart shown in FIG. 4A has a loop in which the process is continued until an area having a different color from the background color for scanning does not remain.

The flowchart in FIG. 4A shows both the process of identifying a closed area and the process of identifying a GUI element in the closed area are performed. However, in the case where closed areas are identified by the user, it is possible for those skilled in the art to change the flowchart shown in FIG. 4A as appropriate so as to identify a GUI element in each of the identified closed areas.

Figure 4B:
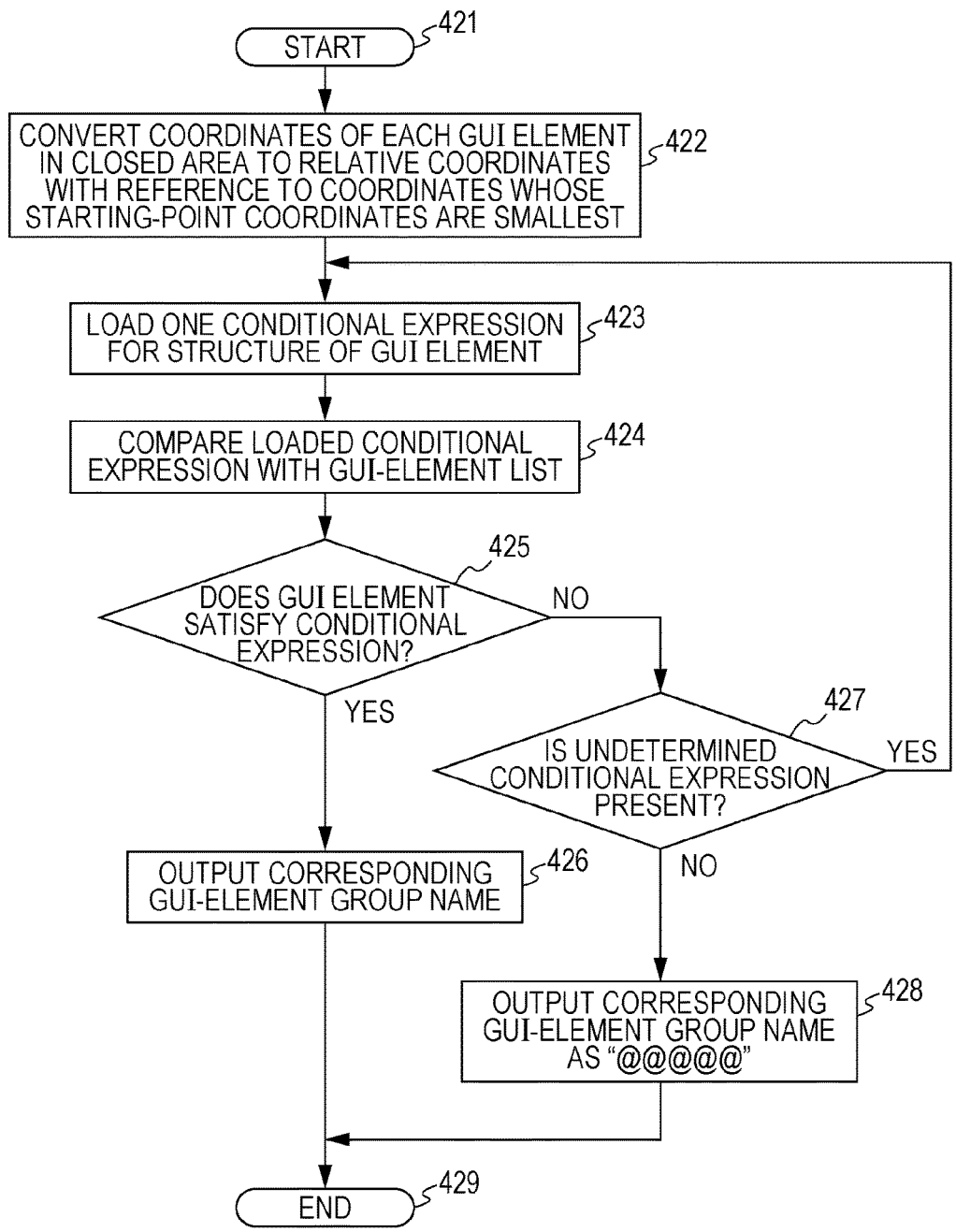
FIG. 4B is a flowchart for the process of determining GUI-element groups of the individual closed areas of the steps in the flowchart shown in FIG. 3 by using first data.

FIG. 4B is a flowchart for the process of determining GUI-element groups of the individual closed areas of the steps in the flowchart shown in FIG. 3 by using the first data.

In step 421, the computer 101 starts the process of determining GUI-element groups of the individual closed areas.

In step 422, the computer 101 converts the coordinates of the GUI elements in the closed areas to relative coordinates with reference to a GUI element whose starting-point coordinates are the smallest.

"Convert coordinates to relative coordinates" will be described herein below. For example, assume that four GUI elements C11, C12, C13, and C14 (depicted in FIGS. 7A-7B), and the coordinate string of the individual GUI elements C11, C12, C13, and C14 are specified as follows:
C11=[rectangular, (50, 70), (300, 90)]
C12=[rectangular, (100, 100), (140, 110)]
C13=[rectangular, (150, 100), (190, 110)]
C14=[rectangular, (200, 100), (260, 110)].

Of the four GUI elements C11, C12, C13, and C14, a GUI element whose starting-point coordinates are the smallest is C11. Accordingly, "Convert coordinates to relative coordinates" means that the coordinates of the GUI elements C12, C13, and C14 are expressed by relative coordinates with reference to the GUI element C11. The four GUI elements C11, C12, C13, and C14 are converted to relative coordinates with reference to the GUI element C11 as follows:
C11=[rectangular, (0, 0), (250, 20)]
C12=[rectangular, (50, 30), (90, 40)]
C13=[rectangular, (100, 30), (140, 40)]
C14=[rectangular, (150, 30), (210, 40)].

In other words, the coordinates of the individual GUI elements C11, C12, C13, and C14 after converted to relative coordinates are substituted by coordinates obtained by subtracting (50, 70) from the individual coordinate values.

In step 423, the computer 101 loads one of conditional expressions for the structure of GUI elements (hereinafter sometimes simply referred to as "conditional expression") to determine the GUI-element group of one closed area. The conditional expression for the structure of the GUI elements can be extracted from the first data (for example, see the GUI-element-group DB 801 shown in FIG. 8A) in which the conditional expression (for example, see a conditional expression 841 shown in FIG. 8C) is stored. Examples of the conditional expressions for the structure of GUI elements will be described with reference to specific examples shown in FIG. 8C.

In step 424, the computer 101 compares the conditional expression loaded in step 423 with the GUI-element list.

In step 425, after the comparison in step 424, the computer 101 determines whether GUI elements in the GUI-element list satisfy the loaded conditional expression. If the GUI elements in the GUI-element list satisfy the loaded conditional expression, the computer 101 advances the process to step 426. In contrast, if the GUI elements in the GUI-element list do not satisfy the loaded conditional expression, the computer 101 advances the process to step 427.

In step 426, in response to the fact that the GUI elements in the GUI-element list satisfy the loaded conditional expression, the computer 101 extracts text data associated with a GUI-element group corresponding to the conditional expression (for example, a GUI-element group name) from the GUI-element-group DB 801 and outputs the extracted GUI-element group name to, for example, the main memory 103. In contrast, in step 427, in response to the fact that the GUI elements in the GUI-element list do not satisfy the loaded conditional expression, the computer 101 determines whether an undetermined conditional expression for the structure of GUI elements is present.

If an undetermined conditional expression is present in step 427, the computer 101 returns the process to step 423 and repeats steps 423 to 427 until no undetermined conditional expression remains. If an undetermined conditional expression is not present, the computer 101 advances the process to step 428.

In step 428, in response to the fact that an undetermined conditional expression is not present, the computer 101 outputs a corresponding GUI-element group name, "@@@@@@", to the main memory 103, for example. The GUI-element group name "@@@@@@" means that a GUI-element group in a closed area whose screen category is under determination is not present in the GUI-element-group DB 801, that is, it is not possible to determine a GUI-element group. Here, the GUI-element group name "@@@@@@" is used to prevent peripheral terms in the second data and the GUI-element group name from accidentally matching in step 518 of FIG. 5B, to be described below, by adopting "@@@@@@" as a character string having a significantly low possibility that it is registered as a peripheral term.

In step 429, the computer 101 terminates the process of determining GUI-element groups in the individual closed areas.

The reason why the coordinates of the individual GUI elements are converted to relative coordinates with reference to a GUI element whose starting-point coordinates are the smallest in the flowchart shown in FIG. 4B is that any coordinate string that is converted to electrical data can be evaluated, provided that the coordinate string is converted to relative coordinates relative to a certain point in the case of evaluating whether, for example, a condition 2 shown in FIG. 8C is satisfied, to determine whether the conditional expression 811 of the conditional expressions of the structure of GUI elements shown in, for example, FIG. 8A.

FIG. 5A is a flowchart, of the steps of the flowchart shown in FIG. 3, for the process of selecting a suitable translation equivalent to one word or phrase in image data from a plurality of translation candidates in the second data.

In step 501, the computer 101 starts the process of selecting a suitable translation equivalent to a word or a phrase in image data.

In step 502, the computer 101 selects one unprocessed original word from among words or phrases in the first language to be translated, which are listed in the second data (for example, see the translation candidates DB 1001 shown in FIG. 10A) (that is, original words to be translated to different words listed in the second data).

In step 503, the computer 101 selects one unprocessed closed area from the closed areas identified in step 303 of FIG. 3.

In step 504, the computer 101 determines whether the original word selected in step 502 is present in the text data extracted from the one closed area selected in step 503. If the selected original word is present in the text data extracted from the one closed area, the computer 101 advances the process to step 505. In contrast, if the selected original word is not present in the text data extracted from the one closed area, the computer 101 advances the process to step 506.

In step 505, in response to the fact that the selected original word is present in the text data extracted from the one closed area, the computer 101 selects a suitable translation equivalent to the word present in the text data from a plurality of translation candidates associated with the word present in the text data in the second data. The processing details of step 505 will be described below with reference to a sub-flowchart shown in FIGS. 5B and 5C. In step 506, in response to the fact that the selected original word is not present in the text data extracted from the one closed area, the computer 101 determines whether unprocessed closed area is present. If an unprocessed closed area is present, the computer 101 returns the process to step 503 and repeats steps 503 to 504 and/or step 505 until no unprocessed closed area remains. If an unprocessed closed area is not present, the computer 101 advances the process to step 507.

In step 507, in response to the fact that an unprocessed closed area is not present, the computer 101 determines whether an unprocessed original word is present in the original words listed in the second data. If an unprocessed original word is present, the computer 101 returns the process to step 502 and repeats steps 503 to 506 until no unprocessed original word remains. If an unprocessed original word is not present, the computer 101 advances the process to step 508.

In step 508, the computer 101 terminates the process of selecting a suitable translation equivalent to the word or phrase in the image data.

According to the embodiment of the present invention, not all of words or phrases in image data are translated. According to the embodiment of the present invention, only for the original words listed in the second data, words or phrases in image data are translated to different words or phrases. This allows the user to list (define) only words or phrases to be translated to different words as original words in the second data.

The flowchart shown in FIG. 5A shows that one unprocessed original word is selected in step 502, and thereafter an unprocessed closed area is selected in step 503. However, the processing loop, shown in step 507, for determining whether an unprocessed original word is present in the second data and the processing loop, shown in step 506, for determining whether an unprocessed closed area is present are independent from each other. Accordingly, the computer 101 may execute the flowchart shown in FIG. 5A in such a manner as to reverse the process of step 502 and the process of step 503 and reverse the process of step 506 and the process of step 507.

Figure 5B:
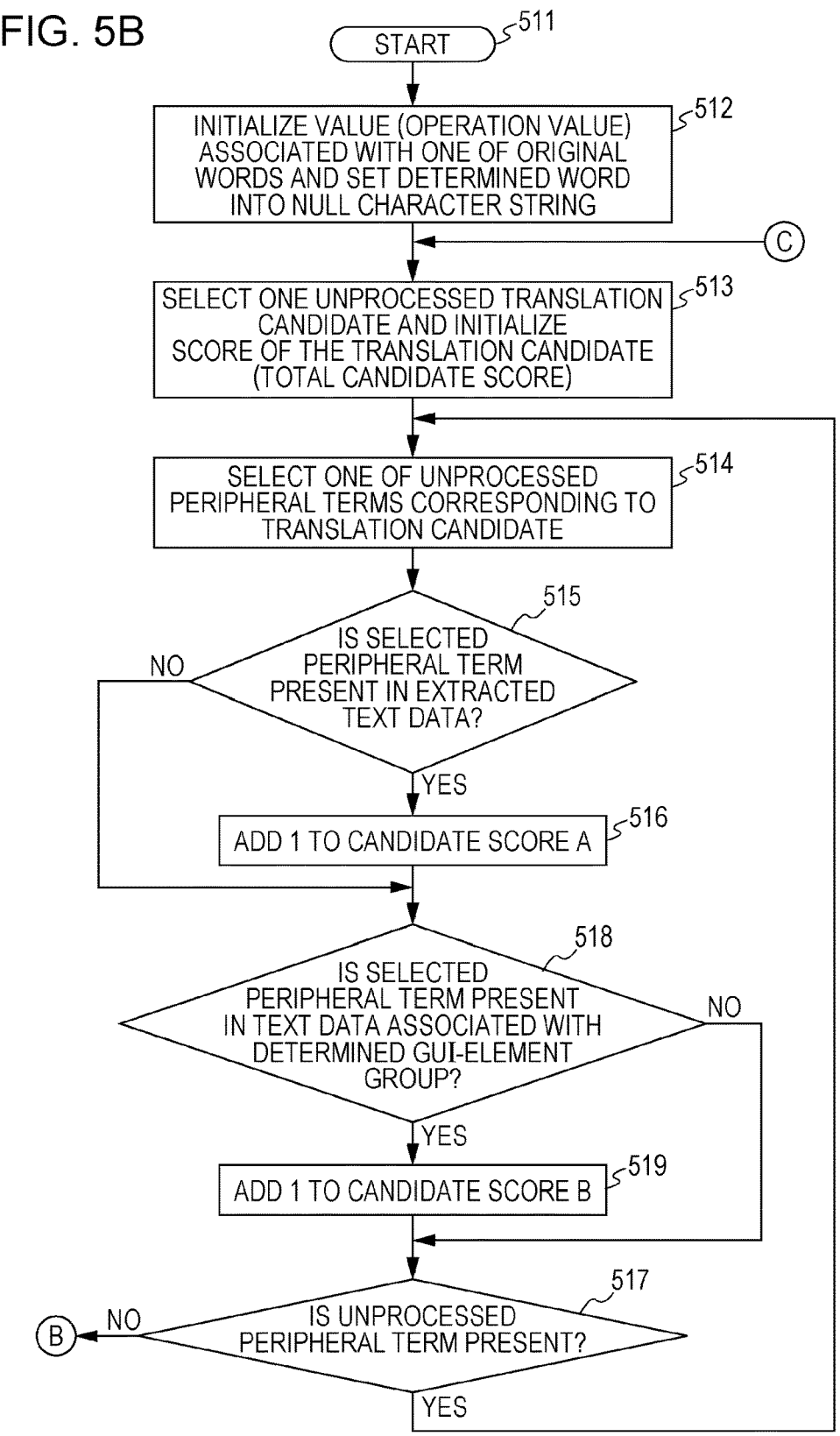
FIG. 5B is a sub-flowchart of the flowchart shown in FIG. 5A.
Figure 5C:
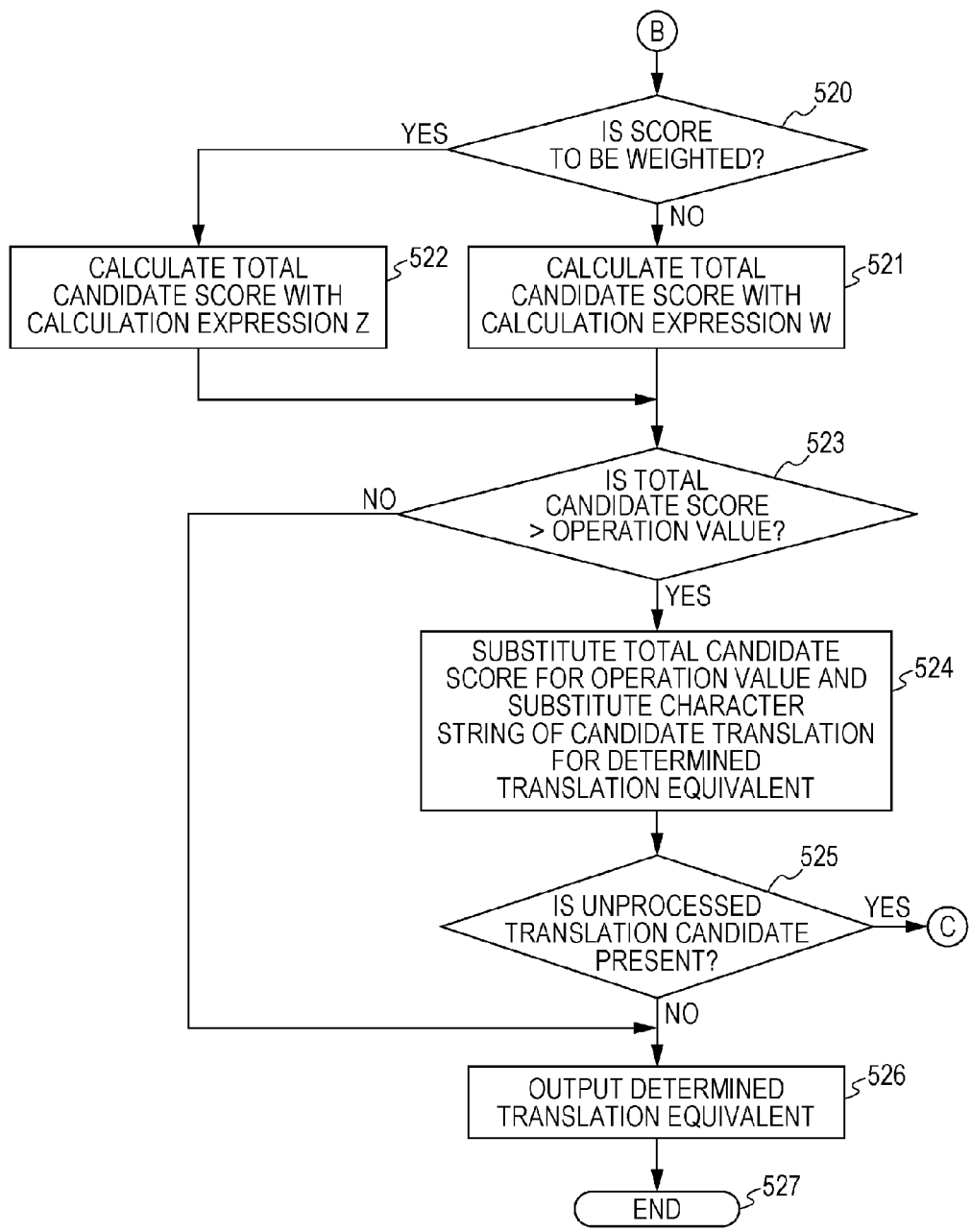
FIG. 5C is a sub-flowchart of the flowchart shown in FIG. 5A.

FIGS. 5B and 5C show a sub-flowchart of step 505 of the flowchart shown in FIG. 5A.

In step 511, in response to the fact that one selected original word is present in the text data extracted from the one selected closed area (see step 504 in FIG. 5A), the computer 101 starts the processes of the sub-flowcharts shown in FIGS. 5B and 5C.

In step 512, the computer 101 initializes a value (hereinafter also referred to as "operation value") associated with the one original word selected in step 502 (present in an operation buffer) in the closed area selected in step 503. An example of the initialization is setting the operation value to zero. The computer 101 sets a determined translation equivalent to the one original word (present in the operation buffer) to a null character string. The determined translation equivalent is one of a plurality of translation candidates associated with the original word in the second data.

In step 513, the computer 101 selects a translation candidate from a plurality of translation candidates (listed in the second data) associated with the original word selected in step 502. The computer 101 initializes a score (total candidate score) (present in the operation buffer) associated with the selected one translation candidate. An example of the initialization is setting the total candidate score to zero. The total candidate score can be obtained by a calculation expression W or Z shown in step 521 or step 522 in FIG. 5C. The computer 101 initializes a candidate score A (see step 516 below) and a candidate score B (see step 519 below) for use in obtaining the total candidate score. An example of the initialization is setting both the candidate score A and the candidate score B to zero.

In step 514, the computer 101 selects one peripheral term from a plurality of peripheral terms (listed in the second data) corresponding to the one translation candidate selected in step 513.

In step 515, the computer 101 determines whether the one peripheral term selected in step 514 is present in the text data extracted in step 305 of FIG. 3. If the selected peripheral term is present in the extracted text data, the computer 101 advances the process to step 516. In contrast, if the selected peripheral term is not present in the extracted text data, the computer 101 advances the process to step 518.

In step 517, the computer 101 determines whether an unprocessed peripheral term corresponding to the one translation candidate selected in step 513 is present. If an unprocessed peripheral term is present, the computer 101 returns the process to step 514 and repeats steps 514 to 516, and optionally, steps 514 to 519 until no unprocessed peripheral terms remains. In contrast, if an unprocessed peripheral term is not present, the computer 101 advances the process to step 520.

In step 516, in response to the fact that the selected one peripheral term is present in the extracted text data, the computer 101 adds 1 to the candidate score A. The candidate score A is a variable (intermediate value) for storing the number of matched peripheral terms present in the extracted text data.

In step 518, the computer 101 determines whether the selected one peripheral term is present in the text data (for example, GUI-element group name) associated with the GUI-element group determined in step 304 of FIG. 3. If the selected one peripheral term is present in the text data associated with the determined GUI-element group, the computer 101 advances the process to step 519. In contrast, if the selected one peripheral term is not present in the text data associated with the determined GUI-element group, the computer 101 advances the process to step 517 and repeats steps 514 to 516, and optionally, steps 514 to 519 until no unprocessed peripheral term corresponding to the one translation candidate selected in step 513 remains.

In step 519, in response to the fact that the selected one peripheral term is present in the text data associated with the determined GUI-element group, the computer 101 adds 1 to the candidate score B. The candidate score B is a variable (intermediate value) for storing the number of matched peripheral terms present in the text data associated with the determined GUI-element group.

Steps 518 and 519 are optional steps. Accordingly, in the case where steps 518 and 519 are not executed, the computer 101 may move the process to step 517 if it is determined in the determination process in step 515 that the selected one peripheral term is not present in the extracted text data or if the process in step 516 ends. By executing steps 518 and 519, the fact that the selected one peripheral term is present in the text data associated with the determined GUI-element group can be used to determine an equivalent word, and thus, a more suitable translation equivalent can be determined than a case where steps 518 and 519 are not executed.

In step 520, the computer 101 determines whether to add a weight. If no weight is to be added, the computer 101 advances the process to step 521. If a weight is to be added, the computer 101 advances the process to step 522.

If no weight is to be added, in step 521, the computer 101 can calculate a total candidate score using, for example, the following calculation expression W:

Total candidate score=candidate score $A$+candidate score $B$  Calculation expression W The above calculation expression W is of a case where the candidate score A and the candidate score B are added up. Alternatively, the total candidate score may be a value obtained by multiplying or exponentiating the candidate score A and the candidate score B together. Those skilled in the art can set any calculation expression W using the candidate score A and the candidate score B so as to determine a suitable translation candidate using the total candidate score according to the present invention.

The calculation expression W can be expressed as a simpler expression in which only (A, B) is used in a two-variable function f(A, B) that uses the candidate score A (hereinafter referred to as A) and the candidate score B (hereinafter referred to as B). For example, if f(A, B)=A+B, where A=4 and B=1, then f(A, B)=5.

If a weight is added, in step 522, the computer 101 can calculate a total candidate score using, for example, the following calculation expression Z:

Total candidate score=weighting information associated with compared translation candidate×candidate score $A$+weighting information associated with text data associated with GUI-element group×candidate score $B$  Calculation expression Z An example of the weighting information associated with text data associated with a GUI-element group is a weight on the GUI-element group name.

The calculation expression Z is of a case where a value obtained by multiplying weighting information associated with a compared translation candidate by the candidate score A (hereinafter also referred to as a value A) and a value obtained by multiplying weighting information associated with text data associated with a GUI-element group by the candidate score B (hereinafter also referred to as a value B) are added up. Alternatively, the total candidate score may be a value obtained by multiplying or exponentiating the value A and the value B together. Those skilled in the art can set any calculation expression Z using the candidate score A, the candidate score B, weighting information associated with a compared translation candidate, and weighting information associated with text data associated with a GUI-element group so as to determine a suitable translation candidate using the total candidate score according to the present invention.

The calculation expression Z can be expressed as a simpler expression in which (A, B, P, and Q) is used in a two-variable function f(A, B) that uses the candidate score A (hereinafter referred to as A), the candidate score B (hereinafter referred to as B), weighting information associated with a compared translation candidate (hereinafter referred to as P), and weighting information associated with text data associated with a GUI-element group (hereinafter referred to as Q). For example, if f(A, B)=P×A+Q×B, where P=8 and Q=50, then f(A, B)=8×A+50×B, and where A=4 and B=1, then f(A, B)=82.

The details of weighting will be described below with reference to specific examples shown in FIGS. 12A to 12D.

As described above, steps 518 and 519 in FIG. 5B are optional steps. Accordingly, in the case where steps 518 and 519 are not executed, the computer 101 may advance the process directly to step 520 in response to the fact that the process in step 517 ends. In this case, the candidate score B is handled as 0 when calculating the total candidate score.

In step 523, the computer 101 determines whether the total candidate score is higher than the operation value by comparing the total candidate score with the operation value. If the total candidate score is higher than the operation value, the computer 101 advances the process to step 524. In contrast, if the total candidate score is not higher than the operation value, the computer 101 advances the process to step 526.

In step 524, in response the fact that the total candidate score is higher than the operation value, the computer 101 substitutes the total candidate score for the operation value. Furthermore, the computer 101 substitutes the character string of a translation candidate having a peripheral term corresponding to the total candidate score used in the substitution for the determined translation equivalent.

In step 525, the computer 101 determines whether an unprocessed translation candidate is present in the second data. If an unprocessed translation candidate is present, the computer 101 returns the process to step 513 and repeats steps 513 to 525 until no unprocessed translation candidate remains. In contrast, if no unprocessed translation candidate is present, the computer 101 advances the process to step 526.

In step 526, the computer 101 outputs the determined translation equivalent in the operation buffer as a suitable translation equivalent to the original word that is determined in step 504 to be present in the extracted text data in the second data. An example of the suitable translation equivalent will be described below with reference to a specific example shown in FIG. 13.

In step 527, the computer 101 terminates the process of the sub-flowchart.

In the case where the operation value is set to zero in step 512 of the flowchart shown in FIG. 5B, if the score of the translation candidate (candidate score) is 0, it is possible not to adopt the determined translation equivalent. This causes, as the worst case, if no peripheral terms that individually correspond to a plurality of translation candidates appear in the text data extracted from a certain closed area, the candidate scores of all the translation candidates to become 0. This causes the flowchart shown in FIG. 5B to end in a state in which the determined translation equivalent is a null character string. However, the embodiment of the present invention allows the flowchart to end as such by setting the operation value to zero.

FIG. 6A shows scanning on web screen data in accordance with an embodiment of the present invention.

The web screen data shown in FIG. 6A is the same as the web screen data shown in FIG. 2A and is an example of web screen data to be translated.

The computer 101 can scan (read) the web screen data by a desired method, for example, by using an image reading unit (for example, a scanner). FIG. 6A shows that an image reading unit scans the image data laterally from the upper left starting point of the web screen data toward the lower right end point in sequence (601, 602, 603, 604, 605, 606, . . . ). The lateral width of one scanning can be freely set by the user in units of pixels, for example. Alternatively, the computer 101 may be adjusted so as to scan a portion having a large amount of image data in small units of pixels and a portion having a small amount of image data in large units of pixels. As another alternative, the image reading unit may read image data all at once in such a manner as to scan the entire breadth of the web screen data from above downward or the entire length from the left to the right.

FIG. 6B shows that closed areas are identified on the web screen data shown in FIG. 2A in accordance with an embodiment of the present invention.

The left screen data in FIG. 6B is the same as the web screen data shown in FIG. 2A.

The right screen data in FIG. 6B shows that three closed areas, that is, an area 611, an area 612, and an area 613, are identified on the web screen. The identification of closed areas can be performed by converting the coordinate string of the line segments (both ends) or rectangles, for example, a combination of (upper left, lower right), of the individual areas into electrical data together with the kind of the shape. An example of the electronically converted coordinate string is [rectangular, (0, 0), (20, 20)], [rectangular, (25, 0), (45, 20)], . . . .

Figure 7A:
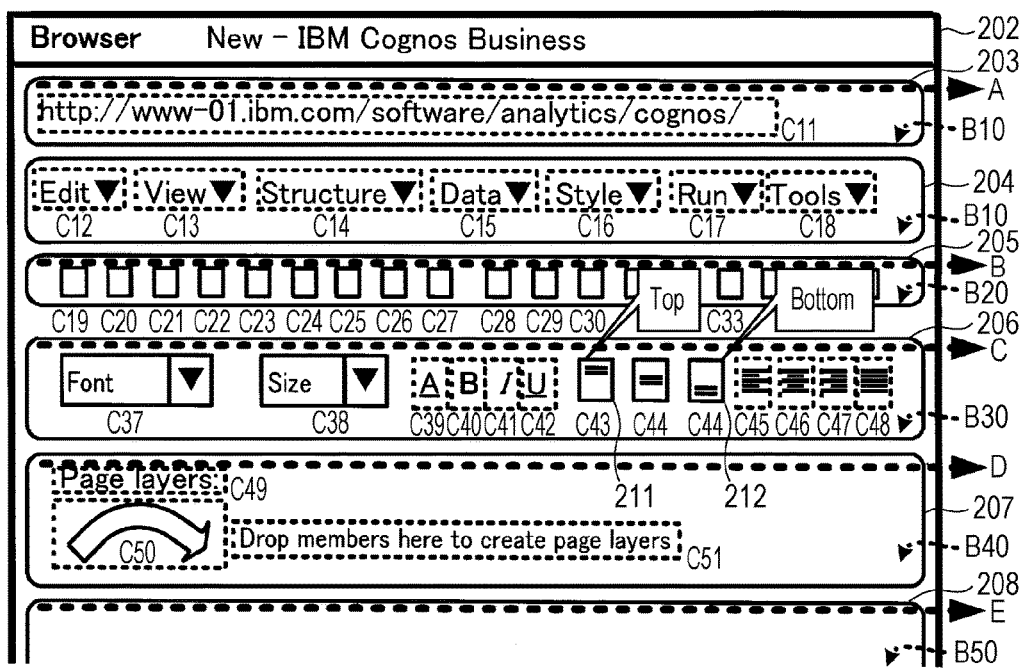
FIG. 7A shows that closed areas and GUI elements in the closed areas are identified on the web screen data shown in FIG. 2A in accordance with an embodiment of the present invention.

FIG. 7A shows that closed areas and GUI elements in the closed areas are identified on the web screen data shown in FIG. 2A in accordance with an embodiment of the present invention.

The web screen data 201 shown in FIG. 7A is the same as the web screen data 201 shown in FIG. 2A and is an example of web screen data to be translated.

A direction in which the image reading unit scans the web screen data 201 can be freely set by the user. FIG. 7A shows that the image reading unit scans the web screen data 201 from the upper left of the web screen data 201 laterally in sequence.

Assume that the image reading unit starts rightward scanning at a position A. In response to the fact that the image reading unit starts rightward scanning at the position A, the computer 101 detects a background color B10 different from a default background color (black). The computer 101 recognizes GUI elements C11 and C12 to C18 that are present in the background color B10 and converts the coordinates of the individual GUI elements C11 and C12 to C18 into electrical data 701. Since the closed area list is empty, the computer 101 adds the coordinates converted to electrical data to the closed area list. Accordingly, the closed area list L is expressed by L={C11, C12, . . . , C18}.

Assume that the image reading unit starts rightward scanning at a position B. In response to the fact that the image reading unit starts rightward scanning at the position B, the computer 101 detects a background color B20 different from the background color B10. The computer 101 recognizes GUI elements C19 to C36 that are present in the background color B20 and converts the coordinates of the individual GUI elements C19 to C36 into electrical data 702. The computer 101 obtains the distance (the vertical distance perpendicular to the scanning direction) between the GUI element C18 whose end-point coordinates are the largest in the closed area list and the GUI element C19 whose starting-point coordinates are the smallest of the GUI elements C19 to C36 detected in the area of the background color B20. Since the distance is within a fixed range, the computer 101 combines the area of the background color B20 and the area of the background color B10 together. Furthermore, the computer 101 adds the coordinates converted to electrical data of the GUI elements C19 to C36 detected in the area of the background color B20 to the closed area list. Accordingly, the closed area list L is expressed by L={C11, C12, ..., C18, C19, C20, ..., C36}.

Assume that the image reading unit starts rightward scanning at a position C. In response to the fact that the image reading unit starts rightward scanning at the position C, the computer 101 detects a background color B30 different from the background color B20. The computer 101 recognizes GUI elements C37 to C48 that are present in the background color B30 and converts the coordinates of the individual GUI elements C37 to C48 into electrical data 703. The computer 101 obtains the distance (the vertical distance perpendicular to the scanning direction) between the GUI element C36 whose end-point coordinates are the largest in the closed area list and the GUI element C37 whose starting-point coordinates are the smallest of the GUI elements C37 to C48 detected in the area of the background color B30. Since the distance is within the fixed range, the computer 101 combines the area of the background color B30 and the area of the background colors B10 and B20 together. Furthermore, the computer 101 adds the coordinates converted to electrical data of the GUI elements C37 to C48 detected in the area of the background color B30 to the closed area list. Accordingly, the closed area list L is expressed by L={C11, C12, ..., C18, C19, C20, ..., C36, C37, C38, ..., C48}.

Assume that the image reading unit starts rightward scanning at a position D. In response to the fact that the image reading unit starts rightward scanning at the position D, the computer 101 detects a background color B40 different from the background color B30. The computer 101 recognizes GUI elements C49 to C51 present in the background color B40 and converts the coordinates of the individual GUI elements C49 to C51 into electrical data (704). The computer 101 obtains the distance (the vertical distance perpendicular to the scanning direction) between the GUI element C48 whose end-point coordinates are the largest in the closed area list and the GUI element C49 whose starting-point coordinates are the smallest of the GUI elements C49 to C51 detected in the area of the background color B40. Since the distance is within the fixed range, the computer 101 combines the area of the background color B40 and the area of the background colors B10 to B30 together. Furthermore, the computer 101 adds the coordinates converted to electrical data of the GUI elements C49 to C51 detected in the area of the background color B40 to the closed area list. Accordingly, the closed area list L is expressed by L={C11, C12, ..., C18, C19, C20, ..., C36, C37, C38, ..., C48, C49, C50, C51}.

Assume that the image reading unit starts rightward scanning at a position E. The computer 101 detects a background color B50 different from the background color B40. The computer 101 recognizes a GUI element C52 (not shown) that is present in the background color B50 and converts the coordinate of the GUI element 52 into electrical data. The computer 101 obtains the distance (the vertical distance perpendicular to the scanning direction) between the GUI element C51 whose end-point coordinates are the largest in the closed area list and the GUI element C52 whose starting-point coordinates are the smallest, detected in the area of the background color B50. Since the distance is not within the fixed range, the computer 101 does not combine the area of the background color B50 with the areas of the background colors B10 to B40. Accordingly, the computer 101 identifies the areas of the background colors B10 to B40 as one closed area. Furthermore, the computer 101 adds the coordinates converted to electrical data of the GUI element C52 detected in the area of the background color B50 to the closed area list. Accordingly, the closed area list L is expressed by, L={C52}.

FIG. 7B shows obtaining the distance between a GUI element whose end-point coordinates are the largest in the closed area list and a GUI element whose starting-point coordinates are the smallest in the GUI elements detected by scanning when identifying closed areas on the web screen data shown in FIG. 2A in accordance with an embodiment of the present invention.

FIG. 7B shows obtaining the distance (vertical distance) between the GUI element C18 whose end-point coordinates are the largest in the closed area list and the GUI element C19 whose starting-point coordinates are the smallest of the GUI elements C19 to C36 detected in the area of the background color B20. The distance 711 is an axial direction perpendicular to the scanning direction B.

The distance between the GUI element C18 whose end-point coordinates are the largest and the GUI element C19 whose starting-point coordinates are the smallest is generally (20, 140)–(260, 110), which can be obtained by general measurement of distance, that is, the square root of the sum of the square of the difference between the X-coordinates and the square of the difference between the Y-coordinates (Pythagorean theorem). However, in an embodiment of the present invention, the distance is determined by obtaining the distance in the axial direction (Y-axis) perpendicular to the scanning direction B (X-axis) as described above, not by Pythagorean theorem. Accordingly, in the above example, the distance between the GUI element C18 whose end-point coordinates are the largest and the GUI element C19 whose starting-point coordinates are the smallest is 140−110=30.

FIG. 8A shows the GUI-element-group DB 801, which is an embodiment of the first data that can be used in an embodiment of the present invention.

FIG. 8A shows an embodiment of the first data. The first data is used to determine a GUI-element group (that is, screen area category) In FIG. 8A, although the first data is expressed as the GUI-element-group DB 801, it need not necessarily be in the form of DB. The GUI-element-group DB 801 is a database in which the kind of screens of the individual closed areas (for example, a schedule screen, an E-mail screen, an editor screen, a report screen, a toolbox screen, and a page moving screen) is defined as rules.

The GUI-element-group DB 801 includes, as a set of data, a conditional expression for the structure of GUI elements and text data associated with a GUI-element group associated with the conditional expression. The GUI-element-group DB 801 may optionally include a weight associated with text data associated with a GUI-element group. An example of the weight associated with text data associated with a GUI-element group is weighting information of a GUI-element group.

The conditional expression for the structure of GUI elements expresses a screen structure identified by at least one of the number, arrangement, area, shape, and kind of the GUI elements. Accordingly, the conditional expression for the structure of GUI elements may be a conditional expression that expresses a screen structure. In FIG. 8A, the conditional expression for the structure of GUI elements is defined, as represented by reference signs 811, 812, 813, and

814. In FIG. 8A, conditional expressions for the structures of GUI elements are expressed as text; alternatively, they may be expressions, not text, that indicate the relationship between the coordinates of GUI elements.

Examples of the text data associated with a GUI-element group is a GUI-element group name and a word that expresses the characteristics of the GUI-element group identified by a conditional expression for the structure of the GUI elements. The GUI-element group name is the name of a screen area categorized by GUI elements present in the closed area. Accordingly, the GUI-element group name can also be referred to as a screen-area category name. In FIG. 8A, the GUI-element group name includes SCHEDULE, EMAIL, EDITOR, REPORT, TOOLBOX, and MOVE PAGE. The GUI-element group names shown in FIG. 8A are merely examples; the user can appropriately set other GUI-element group names. One conditional expression for the structure of GUI elements is associated with one or a plurality of GUI-element group names. In FIG. 8A, the conditional expressions for the structure of GUI elements denoted by reference signs 811, 813, and 814 are individually associated with the GUI-element group names. The conditional expression for the structure of GUI elements denoted by reference sign 812 is associated with a plurality of GUI-element group names (EMAIL, EDITOR, and REPORT).

In step 518 of FIG. 5B, if the selected peripheral term is present in the text data associated with the determined GUI-element group, the weighting information can be used as a bonus score added to the candidate score. How the weighting information of the GUI-element group name is used will be described below with reference to specific examples shown in FIGS. 12B and 12D.

The GUI-element-group DB 801 can be created by, for example, the user. In creating the GUI-element-group DB 801, the user can determine conditional expressions for the structures of GUI elements with reference to, for example, previous image data. The conditional expressions for the structures of GUI elements can be determined by adjustment by the user so that the conditional expressions are mutually exclusive. The user can set suitable names, as GUI-element group names, for expressing conditional expressions for the structures of GUI elements. The user can also set the weighting information in consideration of conditional expressions for the structures of GUI elements.

FIG. 8B shows a schematically programmed process of steps 423 to 427 shown in FIG. 4B, showing examples of conditional expressions for the structures of GUI elements in the first data, which can be used in an embodiment of the present invention.

A GUI-element group determination rule 821 shows the process of determining the individual conditional expressions for the structures of GUI elements shown in FIG. 8A. In response to the individual conditional commands denoted by reference signs 831, 832, 833, and 834, GUI-element groups are determined.

FIG. 8C shows an example of conditional expressions for the structure of GUI elements in the first data, which can be used in an embodiment of the present invention.

FIG. 8C shows a specific description 841 of procedures and conditions for determining whether the conditional expression 811, among the conditional expressions for the structures of GUI elements shown in FIG. 8A, is satisfied. In the case of determining "whether the conditional expression is satisfied?" in step 425 of FIG. 4B, the computer 101 can determine whether the conditional expression is satisfied by loading the description 841 and evaluating the procedures and the conditions in order from above. If a condition at an intermediate point in the description 841 is not satisfied, the computer 101 terminates the evaluation at that point and advances the process to step 427, and if the evaluation of the conditions to the end in the description (841) is completed, the area in process satisfies all the above conditions 1 to 3. Accordingly, the computer 101 advances the process to step 426 of the flowchart shown in FIG. 4B.

The description 841 is evaluated in the order of procedure 1, condition 1, procedure 2, condition 2, and condition 3.

In procedure 1, continuous rectangles 851, 852, 853, 854, 855, 856, and 857 are obtained.

In condition 1, it is evaluated that condition 1 is satisfied since the areas of the seven rectangles 851 to 857 are substantially equal.

In procedure 2, the coordinates of the first rectangle 851 are set to (sx1, sy1) (sx2, sy2), and the coordinates of the seventh rectangle 857 are set to (ex1, ey1) (ex2, ey2)

In condition 2, it is evaluated that condition 2 is satisfied since sy1 of the first rectangle 851 and ey1 of the seventh rectangle 857 are substantially equal, and sy2 of the first rectangle 851 and ey2 of the seventh rectangle 857 are substantially equal.

In condition 3, procedure 1 to condition 2 are repeated and it is evaluated whether procedure 1 to condition 2 can be executed four times or more (that is, four cycles or more).

Figure 8D:
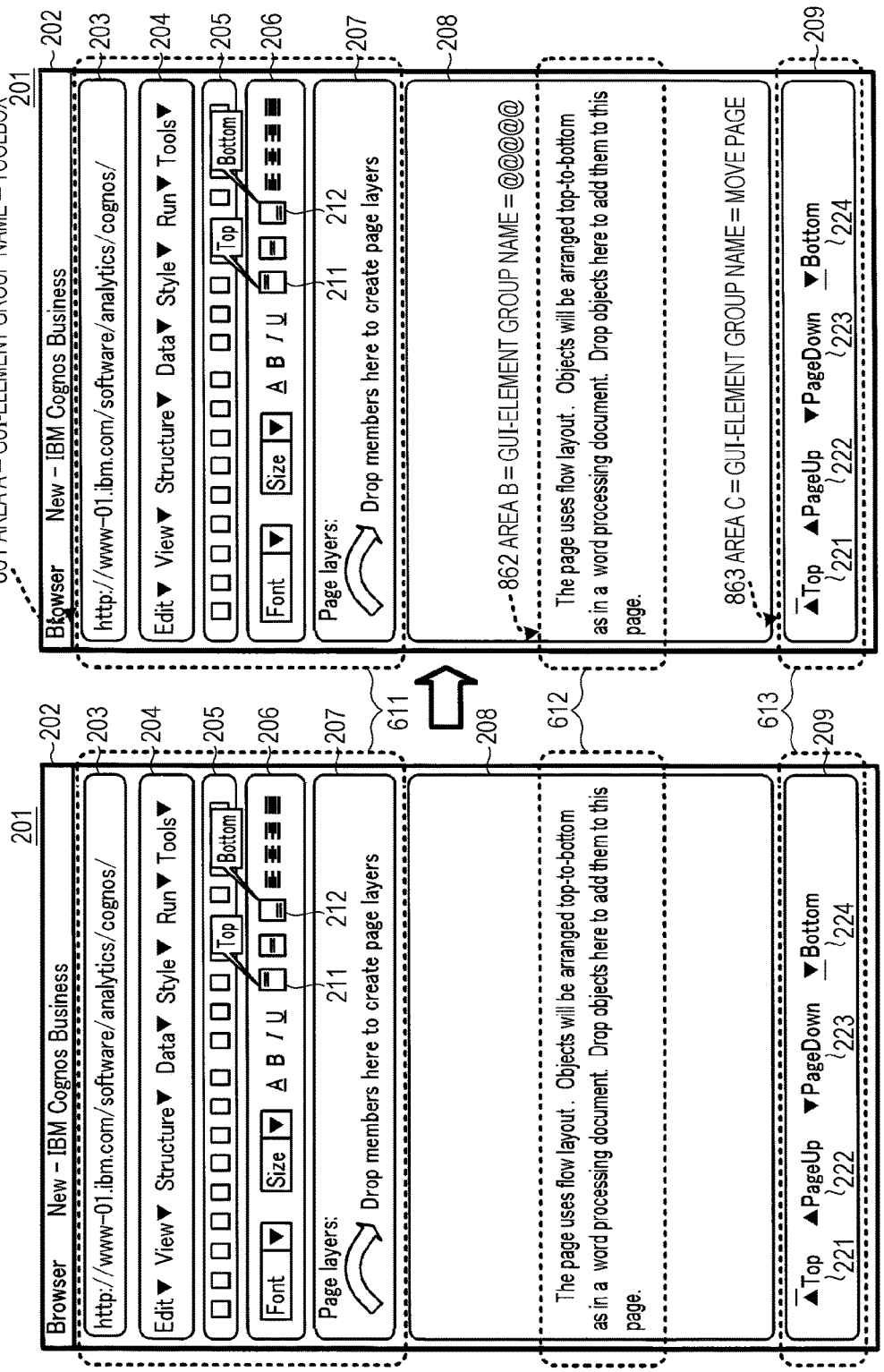
FIG. 8D shows an example in which the GUI-element groups of the individual closed areas on the web screen data shown in FIG. 2A are determined in accordance with an embodiment of the present invention.

FIG. 8D shows an example in which the GUI-element groups of the individual closed areas on the web screen data shown in FIG. 2A are determined in accordance with an embodiment of the present invention.

The web screen data 201 at the left in FIG. 8D is the same as the web screen data 201 shown in FIGS. 6B and 2A.

The web screen data 201 at the right in FIG. 8D shows that the GUI-element groups of individual three closed areas, that is, an area A (611), an area B (612), and an area C (613), are identified on the web screen.

The area A 611 satisfies the conditional expression 813, "eight or more GUI elements of the same size are arranged regularly", of the conditional expressions 811 to 814 for the structures of GUI elements. Accordingly, the computer 101 identifies the GUI-element group name of the area A 611 as "TOOLBOX" 861.

The area B 612 does not satisfy any of the conditional expressions 811 to 814 for the structures of GUI elements. Accordingly, the computer 101 identifies the GUI-element group name of the area B 612 as "@@@@@" 862 in accordance with step 428 of the flowchart shown in FIG. 4B. The GUI-element group name "@@@@@" shows that the area B 612 does not satisfy any of the conditional expressions for the structures of GUI elements listed in the first data.

The area C 613 satisfies the conditional expression 814, "four landscape GUI elements are arranged", of the conditional expressions 811 to 814 for the structures of GUI elements. Accordingly, the computer 101 identifies the GUI-element group name of the area C 613 as "MOVE PAGE" 863.

Figure 9:
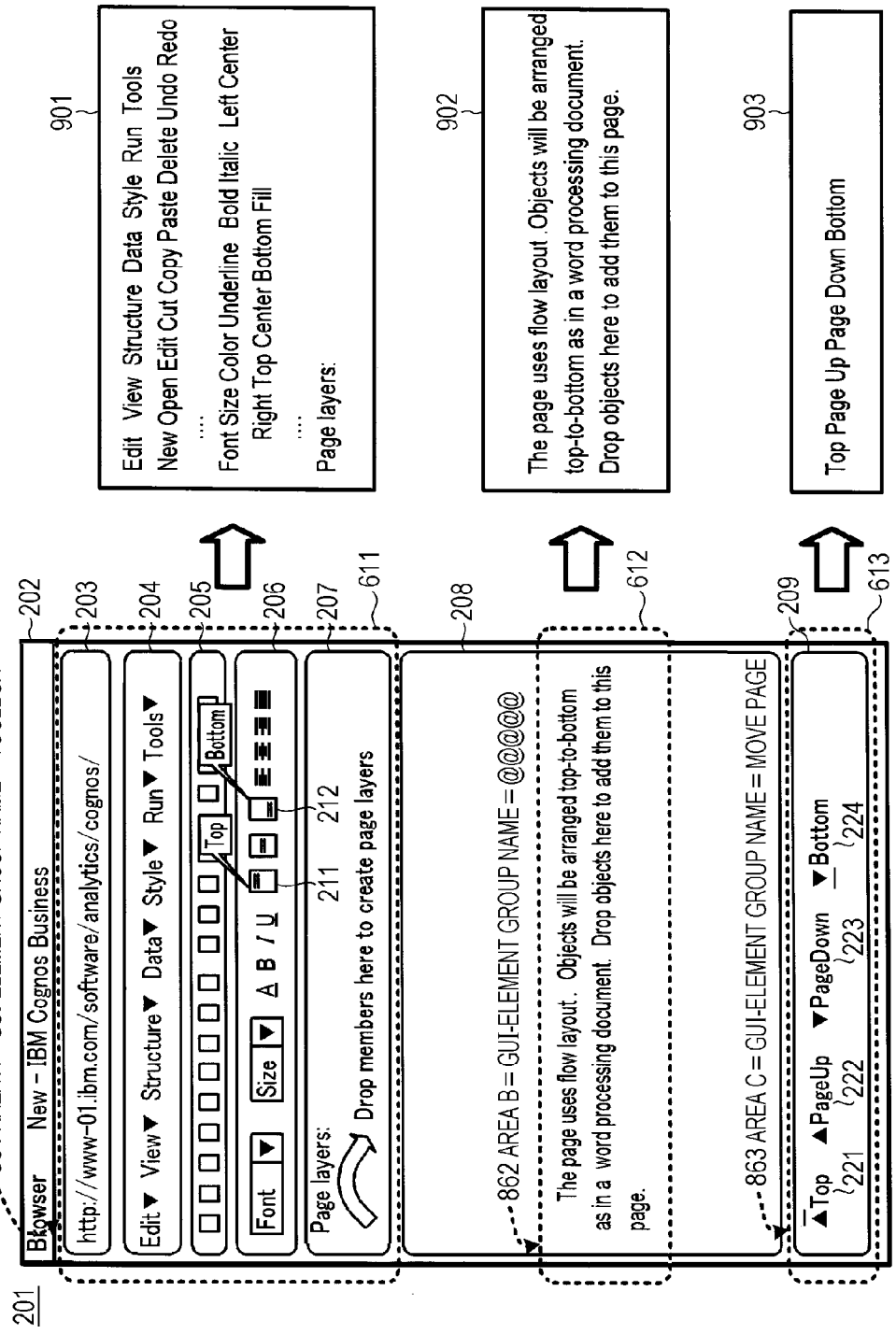
FIG. 9 shows an example in which text is extracted from the individual closed areas on the web screen data shown in FIG. 2A in accordance with an embodiment of the present invention.

FIG. 9 shows an example in which text is extracted from the individual closed areas on the web screen data shown in FIG. 2A in accordance with an embodiment of the present invention.

Text data 901 is extracted from the area A 611. In the text data 901, "New", "Open", "Edit", "Cut", "Copy", "Paste", "Delete", "Undo", and "Redo" are extracted from text data associated with the individual icon 205.

Text data 902 is extracted from the area B 612.

Text data 903 is extracted from the area C 613.

FIGS. 10A and 10B show translation candidates databases 1001 and 1031, which are examples of the second data that can be used in an embodiment of the present invention.

FIGS. 10A and 10B show examples of the second data. The second data is used to translate a word or a phrase in the first language to a translation equivalent in the second language. In FIGS. 10A and 10B, although the second data is expressed as the translation candidates DB 1001, it need not necessarily be in the form of DB.

The translation candidates DB 1001 includes, as a set of data, a word or a phrase in the first language to be translated to different words or phrases, at least two translation candidates associated with the word or phrase, and at least one word (peripheral term) individually associated with the at least two translation candidates. The translation candidates DB 1001 may optionally include weighting information associated with the individual translation candidates.

A word or a phrase in the first language to be translated to different words or phrases in the translation candidates DB 1001 is an original word and for translating a word or a phrase in text data extracted from one of at least one or more closed areas in image data or electronic data including image data or from a file associated with the one closed area to different words or phrases. FIGS. 10A and 10B show a case in which the original word is English.

In the translation candidates DB 1001, at least two translation candidates are associated with one original word. FIGS. 10A and 10B show a case in which the translation candidates are Japanese. FIGS. 10A and 10B show that in the case where English to be translated is "Top", translation candidates associated with the word "Top" are "最初の頁" and "上詰め", and in the case where English to be translated is "Bottom", translation candidates associated with the word "Bottom" are "最後の頁" and "下詰め".

In the translation candidates DB 1001, at least one or more peripheral terms are associated with one translation candidate. In the case where the peripheral term is present in the text data extracted in step 305 of FIG. 3, optionally, in the text data associated with the GUI-element group determined in step 304 of FIG. 3, a translation candidate including the peripheral term is used to select a suitable translation equivalent to the original word.

In FIG. 10A, the translation candidates DB 1001 includes 1 as adding-point information. The adding-point information is used to add 1 to a value associated with a translation candidate (candidate score A) (step 516 in FIG. 5B) in the case where the peripheral term is present in the text data extracted in step 305 shown in FIG. 3 (step 515 in FIG. 5B). The adding-point information is also used to add 1 to a value associated with a translation candidate (candidate score B) (step 519 in FIG. 5B) in the case where the peripheral term is present in the text data (for example, GUI-element group name) associated with the GUI-element group determined in step 304 shown in FIG. 3 (step 518 in FIG. 5B).

In FIG. 10B, the translation candidates DB 1031 includes weighting information. The weighting information is associated with individual translation candidates. The weighting information can be used to add a weight to the candidate score A. For example, if the candidate score A is 3, and the weighting information is 5, for example, the candidate score A, 3, is multiplied by the weighting information, 5 (step 522 in FIG. 5C).

FIG. 11A shows an example in which the extracted text data 901 and peripheral terms associated with two translation candidates 1012 and 1013 are individually compared to find the number of matched words for the individual translation candidates in order to select a suitable translation equivalent by using the translation candidates DB 1001 shown in FIG. 10A in accordance with an embodiment of the present invention.

FIG. 11A shows a case in which the computer 101 sets a data set for English word "Top" 1011 to be translated in the translation candidates DB 1001, and the extracted text data is the text data 901 extracted from the area A 611 shown in FIG. 9. The example shown in FIG. 11A is an example in which steps 518 to 519 shown in FIG. 5B are not executed, no weight is added, and step 521 in FIG. 5C is executed.

The English word "Top" 1011 has two translation candidate "最初の頁" 1012 and "上詰め" 1013.

The computer 101 determines whether a peripheral term associated with the translation candidate "最初の頁" 1012 is present in the extracted text data 901. Since a peripheral term "bottom" is present in the text data 901, the number of matched words is one. Accordingly, the candidate score A of the translation candidate "最初の頁" 1012 (step 516 in FIG. 5B) is 1. Since steps 518 to 519 are not executed, the total candidate score (step 521 in FIG. 5C) is the same 1 as the candidate score A.

The computer 101 determines whether a peripheral term associated with the translation candidate "上詰め" 1013 is present in the extracted text data 901. Since peripheral terms "center", "left", "right", and "bottom" are present in the text data 901, the number of matched words is four. Accordingly, the candidate score A of the translation candidate "上詰め" 1013 (step 516 in FIG. 5B) is 4. Since steps 518 to 519 are not executed, the total candidate score (step 521 in FIG. 5C) is the same 4 as the candidate score A.

As described above, since the total candidate score 4 of the translation candidate "上詰め" 1013 is higher than the total candidate score 1 of the translation candidate "最初の頁" 1012, the operation value is the total candidate score 4 of the translation candidate "上詰め" 1013. Accordingly, the translation candidate "上詰め" 1013 corresponding to the total candidate score used in substitution of the operation value is determined to be a suitable translation equivalent to "Top" in the extracted text data 901.

FIG. 11B shows an example in which the extracted text data 901 and the text data associated with GUI-element groups are individually compared with peripheral terms associated with the two translation candidates 1012 and 1013 to find the number of matched words for the individual translation candidates 1012 and 1013 in order to select a suitable translation equivalent by using the translation candidates DB 1001 shown in FIG. 10A in accordance with an embodiment of the present invention.

FIG. 11B shows a case in which, different from the example shown in FIG. 11A, GUI-element group name "TOOLBOX" is considered in addition to the text data 901 extracted from the area A 611 shown in FIG. 9. The example shown in FIG. 11B is an example in which no weight is added, and step 521 in FIG. 5C is executed.

The computer 101 determines whether a peripheral term associated with the translation candidate "最初の頁" 1012 is present in the extracted text data 901 and the GUI-element group name "TOOLBOX". Since a peripheral term "bottom" is present in the text data 901, the number of matched words is 1. Accordingly, the candidate score A of the translation candidate "最初の頁" 1012 (step 516 in FIG. 5B) is 1. Since the peripheral term has no GUI-element group name, the candidate score B is 0. Accordingly, the total candidate score of the translation candidate "最初の頁" 1012 (step 521 in FIG. 5B) is 1 (1+0).

The computer 101 determines whether a peripheral term associated with the translation candidate "上詰め" 1013 is present in the extracted text data 901 and the GUI-element group name "TOOLBOX". Since peripheral terms "center", "left", "right", and "bottom" are present in the text data 901, the number of matched words is four. Accordingly, the candidate score A of the translation candidate "上詰め" 1013 is 4. Since a peripheral term "toolbox" is present in the GUI-element group name, the number of matched words is one. Accordingly, the candidate score B of the translation candidate "上詰め" 1013 is 1. Accordingly, the total candidate score of the translation candidate " 上詰め" 1013 (step 521 in FIG. 5C) is 5 (4+1).

As described above, since the total candidate score 5 of the translation candidate "上詰め" 1013 is higher than the total candidate score 1 of the translation candidate "最初の頁" 1012, the operation value is the candidate score 5 of the translation candidate "上詰め" 1013. Accordingly, the translation candidate "上詰め" 1013 corresponding to the total candidate score used for substitution of the operation value is determined as a suitable translation equivalent to "Top" in the extracted text data 901.

Figure 11C:
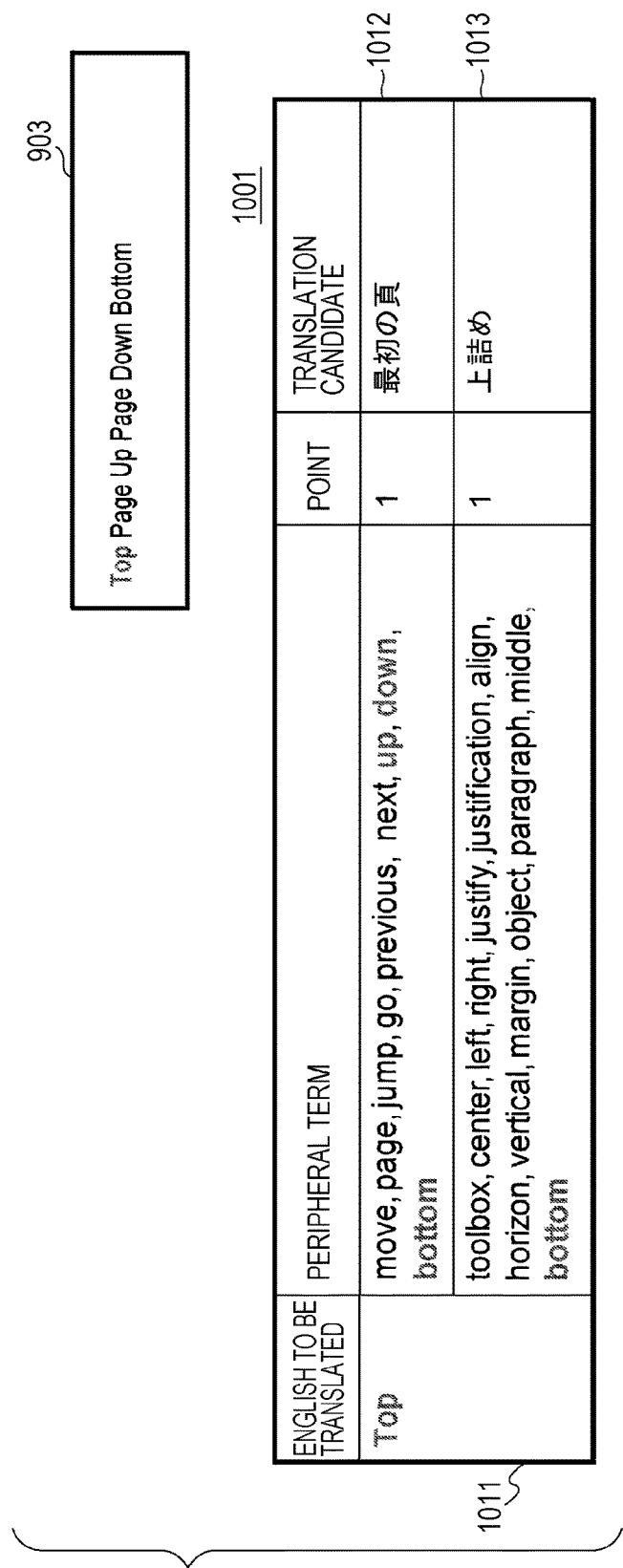
FIG. 11C shows an example in which extracted text data and peripheral terms that are individually associated with two translation candidates are compared to find the number of matched words for the individual translation candidates in order to select a suitable translation equivalent by using the translation candidates database shown in FIG. 10A in accordance with an embodiment of the present invention.

FIG. 11C shows an example in which the extracted text data 903 and peripheral terms that are individually associated with the two translation candidates 1012 and 1013 are compared to find the number of matched words for the individual translation candidates 1012 and 1013 in order to select a suitable translation equivalent by using the translation candidates DB 1001 shown in FIG. 10A in accordance with an embodiment of the present invention.

FIG. 11C shows a case in which the computer 101 loads a data set for the English word "Top" to be translated in the translation candidates DB 1001, and extracted text data is text data 903 extracted from the area C 613 shown in FIG. 9. The example shown in FIG. 11C is an example in which steps 518 to 519 shown in FIG. 5B are not executed, no weight is added, and step 521 in FIG. 5C is executed.

The English word "Top" 1011 has the two translation candidates "最初の頁" 1012 and "上詰め" 1013.

The computer 101 determines whether a peripheral term associated with the translation candidate "最初の頁" 1012 is present in the extracted text data 903. Since peripheral terms "up", "down", and "bottom" are present in the text data 903, the number of matched words is three. Accordingly, the candidate score A of the translation candidate "最初の頁" 1012 (step 516 in FIG. 5B) is 3. Since steps 518 to 519 are not executed, the total candidate score (step 521 in FIG. 5C) is the same 3 as the candidate score A.

The computer 101 determines whether a peripheral term associated with the translation candidate "上詰め" 1013 is present in the extracted text data 903. Since the peripheral term "bottom" is present in the text data 903, the number of matched words is one. Accordingly, the candidate score A of the translation candidate "上詰め" 1013 (step 516 in FIG. 5B) is 1. Since steps 518 to 519 are not executed, the total candidate score (step 521 in FIG. 5C) is the same 1 as the candidate score A.

As described above, since the total candidate score 3 of the translation candidate "最初の頁" 1012 is higher than the total candidate score 1 of the translation candidate "上詰め" 1013, the operation value is the total candidate score 3 of the translation candidate "最初の頁" 1012. Accordingly, the translation candidate "最初の頁" 1012 corresponding to the total candidate score used for substitution of the operation value is determined to be a suitable translation equivalent to "Top" in the extracted text data 903.

FIG. 11D shows an example in which the extracted text data 903 and the text data associated with the GUI-element group are individually compared with peripheral terms that are individually associated with the two translation candidates 1012 and 1013 to find the number of matched words for the individual translation candidates 1012 and 1013 in order to select a suitable translation equivalent by using the translation candidates DB 1001 shown in FIG. 10A in accordance with an embodiment of the present invention.

The example shown in FIG. 11D shows a case in which, different from the example shown in FIG. 11C, a GUI-element group name "MOVE PAGE" is considered in addition to the text data 903 extracted from the area C 613 shown in FIG. 9. The example shown in FIG. 11D is an example in which no weight is added, and step 521 shown in FIG. 5C is executed.

The computer 101 determines whether a peripheral term associated with the translation candidate "最初の頁" 1012 is present in the extracted text data 903 and the GUI-element group name "MOVE PAGE". Since peripheral terms "up", "down", and "bottom" are present in the text data 903, the number of matched words is three. Accordingly, the candidate score A of the translation candidate "最初の頁" 1012 (step 516 in FIG. 5B) is 3. Since peripheral terms "move" and "page" are present in the GUI-element group name, the number of matched words is two. Accordingly, the candidate score B of the translation candidate "最初の頁" 1012 is 2. Accordingly, the total candidate score of the translation candidate "最初の頁" 1012 (step 521 in FIG. 5B) is 5 (3+2).

The computer 101 determines whether a peripheral term associated with the translation candidate "上詰め" 1013 is present in the extracted text data 903 and the GUI-element group name "MOVE PAGE". Since the peripheral term "bottom" is present in the text data 903, the number of matched words is one. Accordingly, the candidate score A of the translation candidate "上詰め" 1013 is 1. Since the peripheral term includes no GUI-element group name, the candidate score B is 0. Accordingly, the total candidate score of the translation candidate "上詰め" 1013 (step 521 in FIG. 5B) is 1 (1+0).

As described above, since the total candidate score 5 of the translation candidate "最初の頁" 1012 is higher than the total candidate score 1 of the translation candidate "上詰め" 1013, the operation value is the candidate score 5 of the translation candidate "最初の頁" 1012. Accordingly, the translation candidate "最初の頁" 1012 corresponding to the total candidate score used in the substitution of the operation value is determined to be a suitable translation equivalent to "Top" in the extracted text data 903.

FIG. 12A shows an example in which the extracted text data 901 and peripheral terms associated with two translation candidates 1042 and 1043 are individually compared to find values (weighted values) obtained from the numbers of matched words for the individual translation candidates in order to select a suitable translation equivalent by using the translation candidates DB 1031 shown in FIG. 10B in accordance with an embodiment of the present invention.

The example shown in FIG. 12A shows a case, different from the example shown in FIG. 11A, the translation candidates DB 1031 including weighting information is used instead of the translation candidates DB 1001 including the adding-point information.

FIG. 12A shows a case in which the computer 101 loads a data set for the English word "Top" to be translated in the translation candidates DB 1031, and extracted text data is the text data 901 extracted from the area A 611 shown in FIG. 9. The example shown in FIG. 12A is also an example in which steps 518 to 519 shown in FIG. 5B are not executed.

The English word "Top" 1041 has two translation candidates "最初の頁" 1042 and "上詰め" 1043.

The computer 101 determines whether a peripheral term associated with the translation candidate "最初の頁" 1042 is present in the extracted text data 901. Since the peripheral term "bottom" is present in the text data 901, the number of matched words is 1. Accordingly, the candidate score A of the translation candidate "最初の頁" 1042 (step 516 in FIG. 5B) is 1. Steps 518 to 519 are not executed. Accordingly, the total candidate score of the translation candidate "最初の頁" 1042 (step 522 in FIG. 5C) is a value 5, (1×5), obtained by multiplying the candidate score A by the weighting information 5 of the translation candidate "最初の頁" 1042.

The computer 101 determines whether a peripheral term associated with the translation candidate "上詰め" 1043 is present in the extracted text data 901. Since the peripheral terms "center", "left", "right", and "bottom" are present in the extracted text data 901, the number of matched words is 4. Accordingly, the candidate score A of the translation candidate "上詰め" 1043 (step 516 in FIG. 5B) is 4. Steps 518 to 519 are not executed. Accordingly, the total candidate score of the translation candidate "上詰め" 1043 (step 522 in FIG. 5C) is a value 32, (4×8), obtained by multiplying the candidate score A by the weighting information 8 of the translation candidate "上詰め" 1043.

As described above, since the total candidate score 32 of the translation candidate "上詰め" 1043 is higher than the total candidate score 5 of the translation candidate "最初の頁" 1042, the operation value is the candidate score 32 of the translation candidate "上詰め" 1043. Accordingly, the translation candidate "上詰め" 1043 corresponding to the total candidate score used in the substitution of the operation value is determined to be a suitable translation equivalent to "Top" in the extracted text data 901.

FIG. 12B shows an example in which the extracted text data 901 and the text data associated with the GUI-element group are compared with peripheral terms that are individually associated with the two translation candidates 1042 and 1043 to find values (weighted values) obtained from the numbers of matched words for the individual translation candidates in order to select a suitable translation equivalent by using the translation candidates DB 1031 shown in FIG. 10B in accordance with an embodiment of the present invention.

The example shown in FIG. 12B shows a case, different from the example shown in FIG. 12A, a GUI-element group name "TOOLBOX" is considered in addition to the text data 901 extracted from the area A 611 shown in FIG. 9.

The computer 101 determines whether a peripheral term associated with the translation candidate "最初の頁" 1042 is present in the extracted text data 901 and the GUI-element group name "TOOLBOX". Since the peripheral term "bottom" is present in the extracted text data 901, the number of matched words is 1. Accordingly, the candidate score A of the translation candidate "最初の頁" 1042 (step 516 in FIG. 5B) is 1. Furthermore, since the peripheral term has no GUI-element group name, the candidate score B is 0. Accordingly, the total candidate score of the translation candidate "最初の頁" 1042 (step 522 in FIG. 5C) is a value 5, (1×5+0×8), obtained by multiplying the candidate score A by the weighting information 5 of the translation candidate "最初の頁" 1042.

The computer 101 determines whether a peripheral term associated with the translation candidate "上詰め" 1043 is present in the extracted text data 901 and the GUI-element group name "TOOLBOX". Since the peripheral terms "center", "left", "right", and "bottom" are present in the extracted text data 901, the number of matched words is four. Accordingly, the candidate score A of the translation candidate "上詰め" 1043 (step 516 in FIG. 5B) is 4. Furthermore, since the peripheral term "toolbox" is present in the GUI-element group name, the number of matched words is one. Accordingly, the candidate score B of the translation candidate "上詰め" 1043 (step 519 in FIG. 5B) is 1. Accordingly, the total candidate score of the translation candidate "上詰め" 1043 (step 522 in FIG. 5C) is a value 82, (32+50), obtained by adding up a value 32, (4×8), obtained by multiplying the candidate score A by the weighting information 8 of the translation candidate "上詰め" 1043 and a value 50, (1×50), obtained by multiplying the candidate score B by the weighting information 50 of the GUI-element group name "TOOLBOX".

As described above, since the total candidate score 82 of the translation candidate "上詰め" 1043 is higher than the total candidate score 5 of the translation candidate "最初の頁" 1042, the operation value is the candidate score 82 of the translation candidate "上詰め" 1043. Accordingly, the translation candidate "上詰め" 1043 corresponding to the total candidate score used in the substitutions of the operation value is determined to be a suitable translation equivalent to "Top" in the extracted text data 901.

Figure 12C:
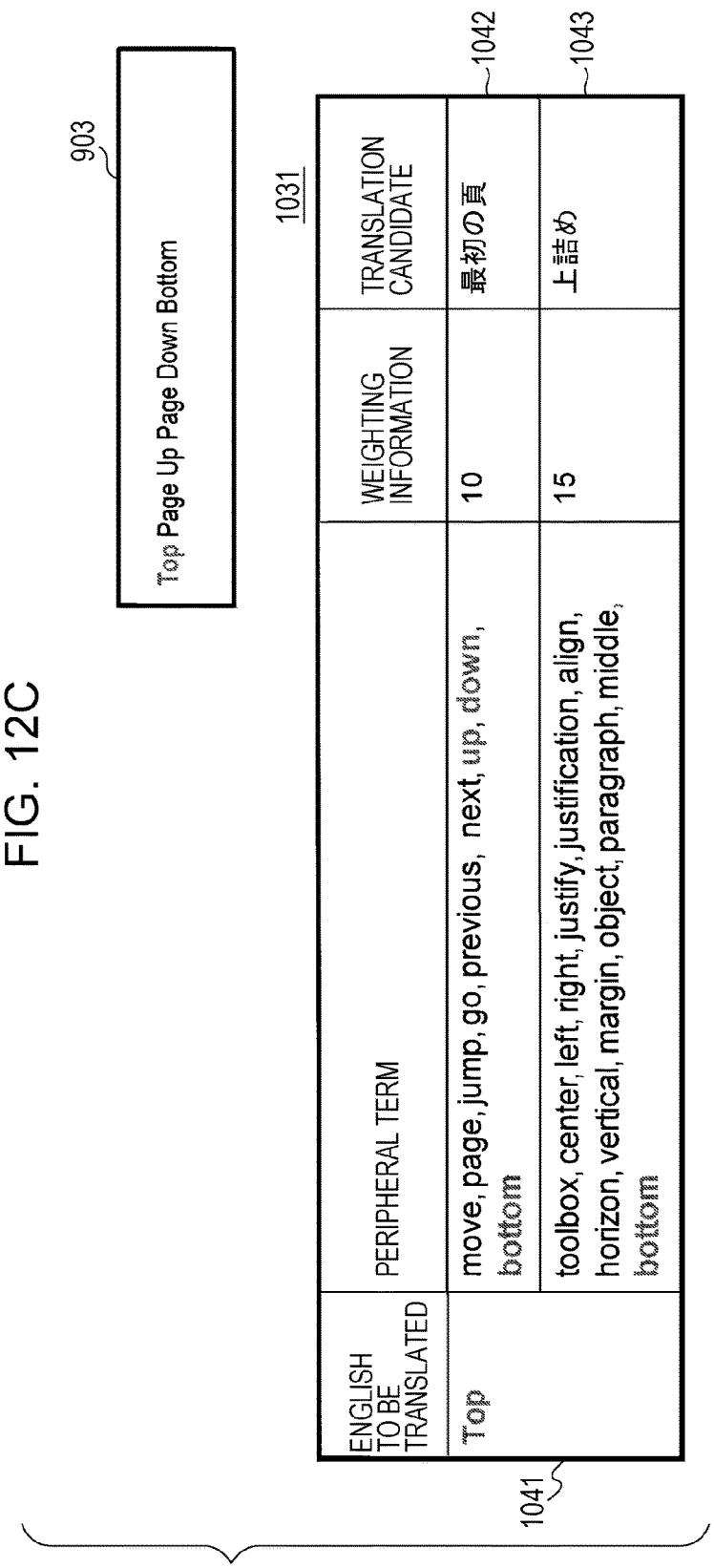
FIG. 12C shows an example in which extracted text data and peripheral terms that are individually associated with two respective translation candidates are compared to find values (weighted values) obtained from the numbers of matched words of the individual translation candidates in order to select a suitable translation equivalent by using the translation candidates database shown in FIG. 10B in accordance with an embodiment of the present invention.

FIG. 12C shows an example in which the extracted text data 903 and peripheral terms that are individually associated with the two respective translation candidates 1042 and 1043 are compared to find values (weighted values) obtained from the numbers of matched words of the individual translation candidates in order to select a suitable translation equivalent by using the translation candidates DB 1031 shown in FIG. 10B in accordance with an embodiment of the present invention.

FIG. 12C shows an example in which the computer 101 loads a data set for the English word "Top" to be translated in the translation candidates DB 1001, and the extracted text data is the text data 903 extracted from the area C 613 shown in FIG. 9. The example shown in FIG. 12C is an example in which steps 518 to 519 shown in FIG. 5B are not executed.

The English word "Top" 1041 has two translation candidates "最初の頁" 1042 and "上詰め" 1043.

The computer 101 determines whether a peripheral term associated with the translation candidate "最初の頁" 1042 is present in the extracted text data 903. Since the peripheral terms "up", "down", and "bottom" are present in the text data 903, the number of matched words is three. Accordingly, the candidate score A of the translation candidate "最初の頁" 1042 (step 516 in FIG. 5B) is 3. Steps 518 to 519 are not executed. Accordingly, the total candidate score of the translation candidate "最初の頁" 1042 (step 522 in FIG. 5C) is a value 30, (3×10), obtained by multiplying the candidate score A by the weighting information 10 of the translation candidate "最初の頁" 1042.

The computer 101 determines whether a peripheral term associated with the translation candidate "上詰め" 1043 is present in the extracted text data 903. Since the peripheral term "bottom" is present in the extracted text data 903, the number of matched words is one. Accordingly, the candidate score A of the translation candidate "上詰め" 1043 (step 516 in FIG. 5B) is 1.

Steps 518 to 519 are not executed. Accordingly, the total candidate score of the translation candidate "上詰め" 1043 (step 522 in FIG. 5C) is a value 15, (1×15), obtained by multiplying the candidate score A by the weighting information 15 of the translation candidate "上詰め" 1043.

As described above, since the total candidate score 30 of the translation candidate "最初の頁" 1042 is higher than the total candidate score 15 of the translation candidate "上詰め" 1043, the operation value is the candidate score 30 of the translation candidate "最初の頁" 1042. Accordingly, the translation candidate "最初の頁" 1042 corresponding to the total candidate score used in the substitution of the operation value is determined as a suitable translation equivalent to "Top" in the extracted text data 903.

FIG. 12D shows an example in which the extracted text data 903 and the text data associated with the GUI-element group are compared with peripheral terms that are individually associated with the two translation candidates 1042 and 1043 to find values (weighted values) obtained from the number of matched words for the individual translation candidates 1042 and 1043 in order to select a suitable translation equivalent by using the translation candidates DB 1031 shown in FIG. 10B in accordance with an embodiment of the present invention.

The example in FIG. 12D shows a case, different from the example in FIG. 12C, in which the GUI-element group name "MOVE PAGE" is considered in addition to the text data 903 extracted from the area C 613 shown in FIG. 9.

The computer 101 determines whether a peripheral term associated with the translation candidate "最初の頁" 1042 is present in the extracted text data 903 and the GUI-element group name "MOVE PAGE". Since the peripheral terms "up", "down", and "bottom" are present in the extracted text data 903, the number of matched words is three. Accordingly, the candidate score A of the translation candidate "最初の頁" 1042 (step 516 in FIG. 5B) is 3. Furthermore, since the peripheral terms "move" and "page" are present in the GUI-element group name, the number of matched words is two. Accordingly, the candidate score B of the translation candidate "最初の頁" 1042 (step 519 in FIG. 5B) is 2. Accordingly, the total candidate score of the translation candidate "最初の頁" 1042 (step 522 in FIG. 5C) is the sum 80, (30+50), of a value 30, (3×10), obtained by multiplying the candidate score A by the weighting information 10 and a value 50, (2×25), obtained by multiplying the candidate score B by the weighting information 25 of the GUI-element group name "MOVE PAGE".

The computer 101 determines whether a peripheral term associated with the translation candidate "上詰め" 1043 is present in the extracted text data 903 and the GUI-element group name "MOVE PAGE". Since the peripheral term "bottom" is present in the extracted text data 903, the number of matched words is one. Accordingly, the candidate score A of the translation candidate "上詰め" 1043 (step 516 in FIG. 5B) is 1. Furthermore, since the peripheral term has no GUI-element group name, the candidate score B is 0. Accordingly, the total candidate score of the translation candidate "上詰め" 1043 (step 522 in FIG. 5C) is a value 15, (1×15+0×25), obtained by multiplying the candidate score A by the weighting information 15 of the translation candidate "上詰め" 1043.

As described above, since the total candidate score 80 of the translation candidate "最初の頁" 1042 is higher than the total candidate score 15 of the translation candidate "上詰め" 1043, the operation value is the candidate score 80 of the translation candidate "最初の頁" 1042. Accordingly, the translation candidate "最初の頁" 1042 corresponding to the total candidate score used in the substitution of the operation value is determined to be a suitable translation equivalent to "Top" in the extracted text data 903.

Figure 13:
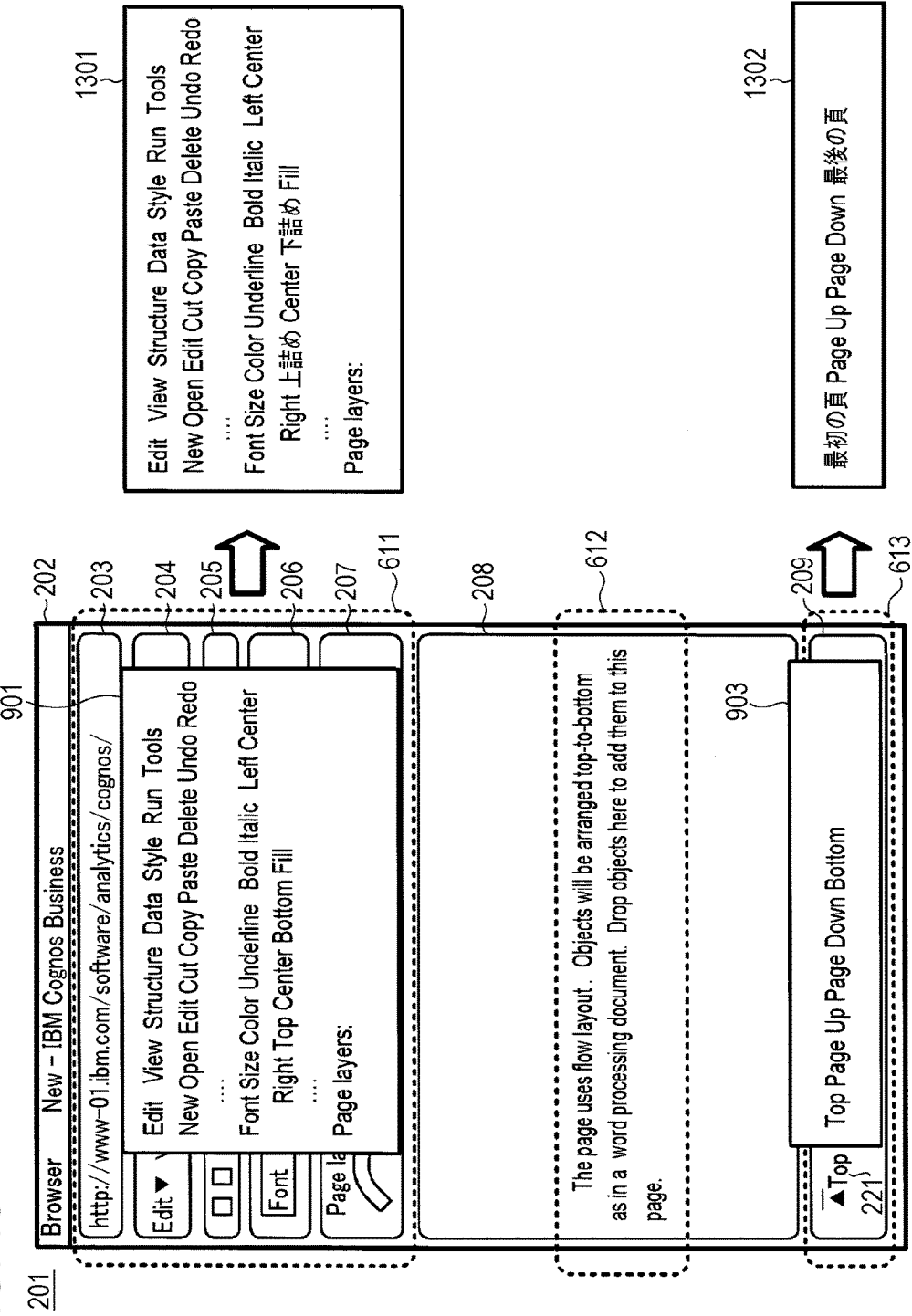
FIG. 13 shows an example of the result of translation of words in text data extracted from the individual closed areas on the web screen data shown in FIG. 2A in accordance with an embodiment of the present invention.

FIG. 13 shows an example of the result of translation of words in text data extracted from the individual closed areas on the web screen data shown in FIG. 2A in accordance with an embodiment of the present invention.

For the area A 611 in the web screen data 201 shown in FIG. 2A, "Top" and "Bottom" in the extracted text data 901 are translated to "上詰め" and "下詰め" (1301), respectively. For the area C 613 in the web screen data 201, "Top" and "Bottom" in the extracted text data 901 are translated to "最初の頁" and "最後の頁" (1302), respectively.

The computer 101 may display the result of one-to-many translation in such a manner as to substitute a word in the first language (English) for a word in the second language (Japanese) and to display the other words in the first language as they are. Alternatively, the computer 101 may display only the result of one-to-many translation in the form of the first language (English)—second language (Japanese); for example, for the area A 611, they may be displayed such that "Top"="上詰め" and "Bottom"="下詰め", and for the area C 613, "Top"="最初の頁" and "Bottom"="最後の頁". As another alternative, as shown in FIG. 2B, words in the first language, whose suitable translation equivalents are determined, may be substituted for words in the second language (Japanese) and may be displayed on the web screen data 201.

The computer 101 may either display the extracted text 901 and 903 on the screen or need not.

FIG. 14 shows an example of a translation candidates DB 1401 that can be used in an embodiment of the present invention, in which original words whose first language is English are translated to different words in accordance with an embodiment of the present invention. Although FIG. 14 shows only a case in which objects to be translated are words, phrases can also be defined, similarly to the words, in the translation candidates DB 1401. As shown in FIG. 14, two or more translation candidates in the second language (in this case, Japanese) are associated with one word in the first language, and peripheral terms are defined for the two or more individual translation candidates.

Figure 15:
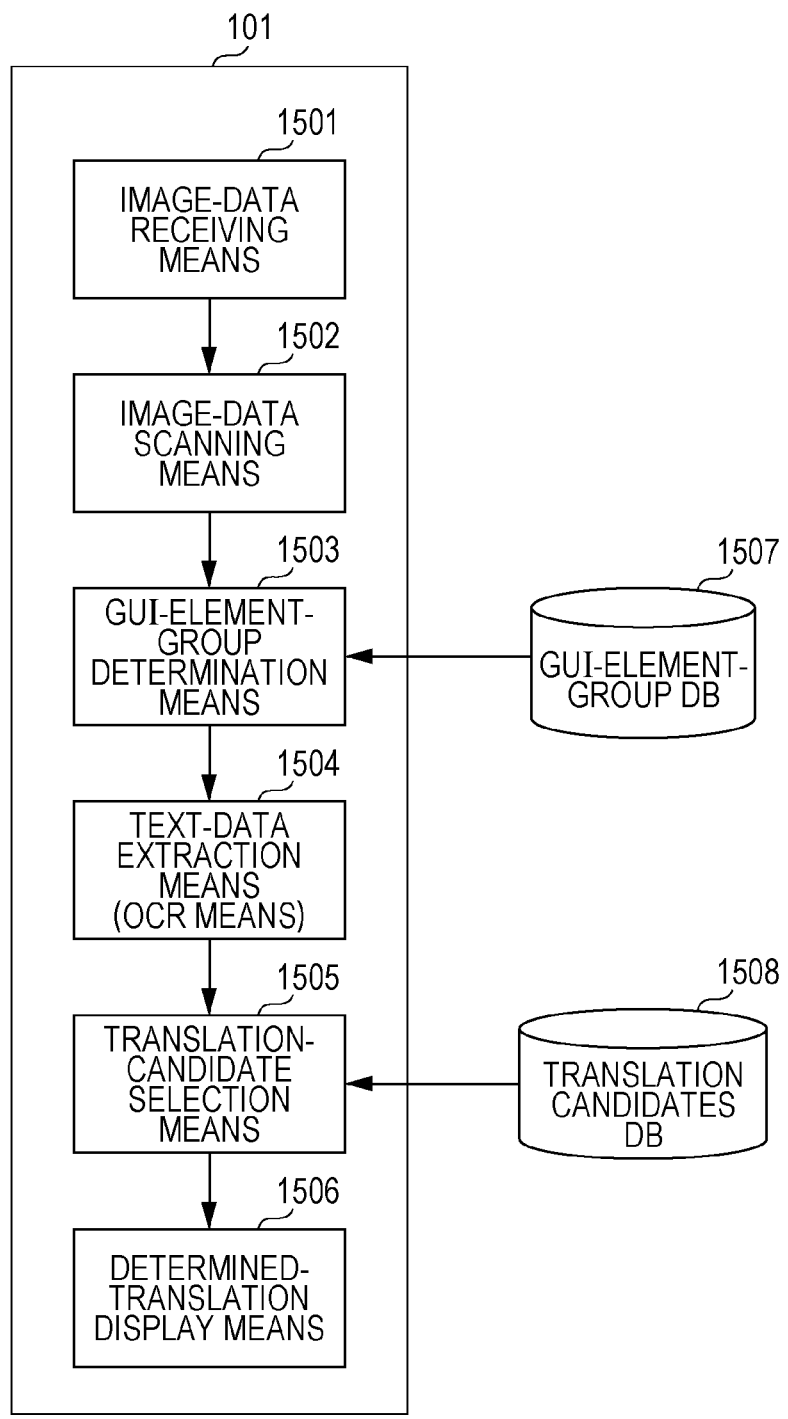
FIG. 15 is a diagram showing an example of a functional block diagram of a computer that preferably has the hardware configuration in FIG. 1 according to an embodiment of the present invention.

FIG. 15 is a diagram showing an example of a functional block diagram of the computer 101 that preferably has the hardware configuration in FIG. 1 according to an embodiment of the present invention.

The computer 101 includes image-data receiving means 1501, image-data scanning means 1502, GUI-element-group determination means 1503, text-data extraction means 1504, translation-candidate selection means 1505, and determined-translation display means 1506. In the case where the first data is installed as a GUI-element-group DB, the computer 101 can access an internal storage unit or an external storage unit that stores a GUI-element-group DB 1507. If the second data is installed as a translation candidates DB, the computer 101 can access an internal storage unit or an external storage unit that stores a translation candidates DB 1508.

The image-data receiving means 1501 can execute step 302 shown in FIG. 3.

The image-data scanning means 1502 can scan image data or electronic data including image data to identify a closed area in the image data in step 303 of FIG. 3 and a GUI element in the closed area. An example of the image-data scanning means 1502 can be an image reading unit (for example, a scanner or a printer, a facsimile machine, or a multifunctional peripheral having a scanner function).

The GUI-element-group determination means 1503 can execute step 304 shown in FIG. 3.

The text-data extraction means 1504 executes step 305 shown in FIG. 3. The text-data extraction means 1504 can have, for example, the function of optical character scanning means.

The translation-candidate selection means 1505 can execute step 306 shown in FIG. 3.

The determined-translation display means 1506 can execute step 307 shown in FIG. 3. Examples of the determined-translation display means 1506 can include the display unit 106 connected to the computer 101 via a cable or wirelessly and the display unit 106 integrally mounted in the computer 101. An example of the determined-translation display means 1506 can be a printer for printing a determined translation equivalent.

As presented herein, it is an object of the present invention to automatically and appropriately translate a word or a phrase in a first language, to be translated to different words, in image data or electronic data including image data, such as a GUI image document, to a translation equivalent in a second language. For example, FIGS. 16A and 16B show a case where English "From/To" needs to be translated to Japanese "開始日時/ 終了日時 (Start/End time)" or "差出人/宛先 (Sender/Destination)" in the GUI image document.

FIG. 16A shows one-to-many translation of English "From/To" in a calendar screen 1601. In the calendar, English "From/To" should be translated to Japanese "開始日時/ 終了日時" 1602 not to Japanese "差出人/宛先" 603.

Figure 16B:
FIG. 16B shows that English "From/To" in an e-mail screen should be translated to "差出人／宛先" not to "開始日時／終了日時".

FIG. 16B shows one-to-many translation of English "From/To" in an e-mail screen 1611. In the e-mail screen, English "From/To" should be translated to Japanese "差出人/宛先" 1612 not to Japanese "開始日時/ 終了日時" 1613.

Another object of the present invention is to automatically and appropriately translate a word or a phrase in a first language, to be translated to different words, in image data, to a translation equivalent in a second language even if the word or phrase in the image data are listed and sorted in alphabetical order.

The present invention provides a technique for translating a word or a phrase in a first language to be translated to different words in image data (that is, an original word or phrase) to a translation equivalent in a second language. In the case where there are a plurality of translation equivalents to a word or a phrase in the first language, the technique allows a suitable translation equivalent (that is, an appropriate translation) to the word or phrase in the first language to be determined from among the plurality of translation candidates (hereinafter referred to as translation candidates). The technique can include a method for determining a suitable translation equivalent, and a computer, a computer program, and a computer program product for the same.

The method of the present invention includes, if at least one or more closed areas in image data or electronic data including image data are identified, determining, by using first data, to which of a plurality of GUI element groups defined in advance the individual identified closed areas correspond, wherein the first data includes, as a set of data, at least one conditional expression for the structure of GUI elements in the image data and text data associated with at least one GUI-element group associated with the conditional expression; extracting text data from one of the identified closed areas or a file associated with the one closed area; and if a word or a phrase in the first language to be translated to different words is present in the extracted text data, the word or phrase being listed in second data for use in translating the word or phrase in the first language to a translation equivalent in the second language, selecting a translation equivalent to the word or phrase from a plurality of translation candidates in the second data.

The computer of the present invention includes receiving means for receiving image data or electronic data including image data; GUI-element-group determination means that, if at least one or more closed areas in the image data or the electronic data including image data are identified, determines, by using first data, to which of a plurality of GUI element groups defined in advance the individual identified closed areas correspond, wherein the first data includes, as a set of data, at least one conditional expression for the structure of GUI elements in the image data and text data associated with at least one GUI-element group associated with the conditional expression; text-data extraction means that extracts text data from one of the identified closed areas or a file associated with the one closed area; and translation-candidate selection means that, if a word or a phrase in the first language to be translated to different words is present in the extracted text data, the word or phrase being listed in second data for use in translating the word or phrase in the first language to a translation equivalent in the second language, selects a translation equivalent to the word or phrase from a plurality of translation candidates in the second data.

One object of the present invention is to appropriately translate a word or a phrase in a first language, to be translated to different words, in image data or electronic data including image data, such as a graphical user interface (GUI) image document, to a translation equivalent in a second language.

Thus, in one embodiment, the present invention thus provides a method for translating a word or a phrase in a first language to be translated (that is, an original word) to different words to a translation equivalent in a second language and a computer and a computer program for the same. In the case where there are a plurality of translation equivalents to a word or a phrase in the first language, the present invention allows a suitable translation equivalent to the word or phrase to be determined from among the plurality of translation candidates.

The present invention also provides a computer program and a computer program product that cause a computer to execute the steps of the method according to the present invention.

The computer program for executing the function of the present invention can be stored in a flexible disk, an MO, a CD-ROM, a DVD, a BD, a hard disk, a memory medium connectable to a USB, and any computer-readable recording medium, such as a ROM, an MRAM, or a RAM. The computer program can be loaded into a recording medium from another data processing system connected via a communication line or can be copied from another recording medium. The computer program can also be compressed or divided into a plurality of pieces and can be stored in a single or a plurality of recording media. Note that it is of course possible to provide computer program products for achieving the present invention in various forms. Examples of the computer program products can include a storage medium in which the computer program is recorded or a transmission medium that transmits the computer program.

Note that the outline of the present invention described above does not include all necessary features of the present invention and a combination or sub-combination of these components can also be the present invention.

It will also be obvious to those skilled in the art that various changes can be made in the hardware components of the computer used in an embodiment of the present invention, such as combining them with a plurality of machines and distributing the functions thereto. These changes are of course included in the spirit of the present invention. These components are merely examples, and all the components are not absolutely necessary for the present invention.

The present invention can be achieved as hardware, software, or, a combination of hardware and software. A typical example of implementation using a combination of hardware and software is implementation in an apparatus in which the computer program is installed. In such a case, by loading the computer program into the memory of the apparatus and implementing it, the computer program controls the apparatus and causes the apparatus to implement processes according to the present invention. The computer program can include sets of instructions that can be expressed by any languages, codes, or notations. Such instructions allow the apparatus to implement a specific function directly or after one of or both 1. converting it to another language, code, or notation and 2. copying it to another medium.

According to an embodiment of the present invention, by identifying a closed area in image data, an area to be a peripheral term in selecting a suitable translation equivalent to an original word in the image data can be freely localized.

According to an embodiment of the present invention, by appropriately creating first data for use in determining a GUI-element group and second date for use in translating a word or a phrase in the first language to a translation equivalent in a second language, a suitable translation equivalent to an original word in image data can be determined without involvement of a human.

According to an embodiment of the present invention, by using the first data for use in determining a GUI-element group, a suitable translation equivalent that takes into account a GUI-element group that is defined in advance can be determined.

According to an embodiment of the present invention, by determining a GUI-element group that is defined in advance, a suitable translation equivalent can be determined using GUI elements in the periphery of the original word.

According to an embodiment of the present invention, by appropriately defining only a word or a phrase to be translated to different words in the second data as an original word, a suitable translation equivalent to a word or a phrase in image data can be automatically determined without involvement of a human only for the original words listed in the second data.

According to an embodiment of the present invention, not only for words but also for phrases formed of several words defined as original words in the second data, a suitable translation equivalent can be selected using the second data.

According to an embodiment of the present invention, also in the case where words or phrases to be translated in image data are listed and sorted in alphabetical order, a suitable translation equivalent to an original word in the image data can be determined.

What is claimed is:

1. A method comprising:
defining, by one or more processors, a first section in a graphical user interface (GUI), wherein the first section is a first delineated area on the GUI that is dedicated to displaying executable format icons from a first area category, wherein the first area category is for icons that control a format of a document;
defining, by one or more processors, a second section of the GUI, and wherein the second section is a second delineated area on the GUI that is dedicated to displaying executable page moving icons from a second area category, wherein the second area category is for icons that move a display of the document to a particular place in the document;
receiving, by one or more processors, electronic data that includes image data, wherein the image data describes a particular executable format icon in the first section and a particular executable page moving icon in the second section, wherein the particular executable format icon is initially labeled with a first label in a first language, wherein the particular executable page moving icon is initially labeled with a second label in the first language, and wherein the first label and the second label are a same label in the first language;
translating, by one or more processors, the first label in the first language into a first label in a second language and the second label in the first language into a second label in the second language, wherein the first label in the second language and the second label in the second language are different labels that have different definitions as compared to one another when written in the second language, wherein a translation of the first label from the first language into the second language is a first translation that is based on the particular executable format icon being displayed in the first section, and wherein a translation of the second label from the first language into the second language is a second translation that is based on the particular executable page moving icon being displayed in the second section;
receiving, by one or more processors, a document format user input that selects the particular executable format icon, wherein the first label of the particular executable format icon has been translated into the second language;
formatting, by one or more processors, the document according to the received document format user input;
receiving, by one or more processors, a document page movement user input for moving the display of the document to the particular place in the document, wherein the document page movement user input has been translated into the second language;
in response to receiving the document page movement user input, moving, by one or more processors, the display of the document to the particular place in the document;
generating, by one or more processors, a candidate score A, wherein the candidate score A is for a particular translation, from a group of candidate translations, for the first label of the particular executable format icon in the first section, wherein the candidate score A is based on how many peripheral terms in the first section are associated with the particular translation;
generating, by one or more processors, a candidate score B, wherein the candidate score B is based on how many of the peripheral terms in the section are found in a group name of icons in the first section:
adding, by one or more processors, the candidate score A to the candidate score B to create a total candidate score; and identifying, by one or more processors, the particular translation as being the first label in the second language based on the total candidate score of the particular translation exceeding a predefined value.

2. The method according to claim 1, wherein the first label in the second language is a first label translation, and wherein the method further comprises:
   retrieving, by one or more processors, extracted text data from the first section, wherein the extracted text data include labels, text, and help information presented in the first section;
   matching, by one or more processors, the extracted text data to multiple peripheral terms that are associated with the first label translation; and
   determining, by one or more processors, that the particular executable format icon is from the first area category based on a quantity of the extracted text data matching the multiple peripheral terms at a predefined quantity.

3. The method according to claim 2, wherein the extracted text data and the multiple peripheral terms are in the first language.

4. The method according to claim 1, further comprising:
   comparing, by one or more processors, a displayed size and orientation of the particular executable format icon in the first section to multiple other icons;
   determining, by one or more processors, that the particular executable format icon and the multiple other icons are a same size;
   in response to determining that the particular executable format icon and the multiple other icons are a same size, determining, by one or more processors, that the particular executable format icon and the multiple other icons are of a predefined quantity of icons; and
   in response to determining that the particular executable format icon and the multiple other icons are of the predefined quantity of icons, assigning, by one or more processors, the particular executable format and the multiple other icons to the first area category.

5. The method according to claim 1, further comprising:
   determining, by one or more processors, a physical distance between two input icons as displayed on the GUI; and
   in response to determining that the physical distance between the two input icons on the GUI is less than a predetermined distance, assigning, by one or more processors, the two input icons to the first area category.

6. The method according to claim 1, wherein the first language is a letter-based language and the second language is a logographic based language.

7. The method according to claim 1, wherein executing the particular executable format icon causes a computer to perform a first function, wherein executing the particular executable page moving icon causes the computer to perform a second function, and wherein the first function and the second function are different functions.

8. The method of claim 1, further comprising:
   identifying, by one or more processors, a label in the second language that both includes a translation of the first label from the first language and a functional relationship with multiple peripheral terms in the first section of the GUI, wherein the multiple peripheral terms are located in the first section of the GUI but define different features than that provided by the particular executable format icon in the first section; and
   selecting, by one or more processors, the label in the second language that both includes the translation of the first label from the first language and the functional relationship with multiple peripheral terms in the first section of the GUI as the translation of the first label from the first language into the second language.

9. A computer program product comprising a non-transitory computer readable storage device having program instructions embodied therewith, the program instructions readable and executable by a computer to perform a method comprising:
   defining a first section in a graphical user interface (GUI), wherein the first section is a first delineated area on the GUI that is dedicated to displaying executable format icons from a first area category, wherein the first area category is for icons that control a format of a document;
   defining a second section of the GUI, and wherein the second section is a second delineated area on the GUI that is dedicated to displaying executable page moving icons from a second area category, wherein the second area category is for icons that move a display of the document to a particular place in the document;
   receiving electronic data that includes image data, wherein the image data describes a particular executable format icon in the first section and a particular executable page moving icon in the second section, wherein the particular executable format icon is initially labeled with a first label in a first language, wherein the particular executable page moving icon is initially labeled with a second label in the first language, and wherein the first label and the second label are a same label in the first language;
   translating the first label in the first language into a first label in a second language and the second label in the first language into a second label in the second language, wherein the first label in the second language and the second label in the second language are different labels that have different definitions as compared to one another when written in the second language, wherein a translation of the first label from the first language into the second language is a first translation that is based on the particular executable format icon being displayed in the first section, and wherein a translation of the second label from the first language into the second language is a second translation that is based on the particular executable page moving icon being displayed in the second section;
   receiving a document format user input that selects the particular executable format icon, wherein the first label of the particular executable format icon has been translated into the second language;
   formatting the document according to the received document format user input;
   receiving a document page movement user input for moving the display of the document to the particular place in the document, wherein the document page movement user input has been translated into the second language;
   in response to receiving the document page movement user input, moving the display of the document to the particular place in the document;
   generating a candidate score A, wherein the candidate score A is for a particular translation, from a group of candidate translations, for the first label of the particular executable format icon in the first section, wherein the candidate score A is based on how many peripheral terms in the first section are associated with the particular translation;

generating a candidate score B, wherein the candidate score B is based on how many of the peripheral terms in the section are found in a group name of icons in the first section;

adding the candidate score A to the candidate score B to create a total candidate score; and identifying the particular translation as being the first label in the second language based on the total candidate score of the particular translation exceeding a predefined value.

10. The computer program product according to claim 9, wherein the method further comprises:

retrieving extracted text data from the first section, wherein the extracted text data include labels, text, and help information presented in the first section;

matching the extracted text data to multiple peripheral terms that describe the particular executable format icon; and determining that the particular executable format icon is from the first area category based on a quantity of the extracted text data matching the multiple peripheral terms at a predefined quantity.

11. The computer program product according to claim 9, wherein the method further comprises:

comparing a displayed size and orientation of the particular executable format icon in the first section to multiple other icons;

determining that the particular executable format icon and the multiple other icons are a same size;

in response to determining that the particular executable format icon and the multiple other icons are a same size, determining that the particular executable format icon and the multiple other icons are of a predefined quantity of icons; and in response to determining that the particular executable format icon and the multiple other icons are of the predefined quantity of icons, assigning the particular executable format and the multiple other icons to the first area category.

12. The computer program product according to claim 9, wherein the method further comprises:

determining a physical distance between two input icons as displayed on the GUI; and in response to determining that the physical distance between the two input icons on the GUI is less than a predetermined distance, assigning the two input icons to the first area category.

13. The computer program product according to claim 9, wherein executing the particular executable format icon causes a computer to perform a first function, wherein executing the particular executable page moving icon causes the computer to perform a second function, and wherein the first function and the second function are different functions.

14. A computer system comprising one or more processors, one or more computer readable memories, one or more computer readable storage mediums, and program instructions stored on at least one of the one or more computer readable storage mediums for execution by at least one of the one or more processors via at least one of the one or more computer readable memories, the stored program instructions comprising:

program instructions to define a first section in a graphical user interface (GUI), wherein the first section is a first delineated area on the GUI that is dedicated to displaying executable format icons from a first area category, wherein the first area category is for icons that control a format of a document;

program instructions to define a second section of the GUI, and wherein the second section is a second delineated area on the GUI that is dedicated to displaying executable page moving icons from a second area category, wherein the second area category is for icons that move a display of the document to a particular place in the document;

program instructions to receive electronic data that includes image data, wherein the image data describes a particular executable format icon in the first section and a particular executable page moving icon in the second section, wherein the particular executable format icon is initially labeled with a first label in a first language, wherein the particular executable page moving icon is initially labeled with a second label in the first language, and wherein the first label and the second label are a same label in the first language;

program instructions to translate the first label in the first language into a first label in a second language and the second label in the first language into a second label in the second language, wherein the first label in the second language and the second label in the second language are different labels that have different definitions as compared to one another when written in the second language, wherein a translation of the first label from the first language into the second language is a first translation that is based on the particular executable format icon being displayed in the first section, and wherein a translation of the second label from the first language into the second language is a second translation that is based on the particular executable page moving icon being displayed in the second section;

program instructions to receive a document format user input that selects the particular executable format icon, wherein the first label of the particular executable format icon has been translated into the second language;

program instructions to format the document according to the received document format user input;

program instructions to receive a document page movement user input for moving the display of the document to the particular place in the document, wherein the document page movement user input has been translated into the second language;

program instructions to, in response to receiving the document page movement user input, move the display of the document to the particular place in the document;

program instructions to generate a candidate score A, wherein the candidate score A is for a particular translation, from a group of candidate translations, for the first label of the particular executable format icon in the first section, wherein the candidate score A is based on how many peripheral terms in the first section are associated with the particular translation;

program instructions to generate a candidate score B, wherein the candidate score B is based on how many of the peripheral terms in the section are found in a group name of icons in the first section;

program instructions to add the candidate score A to the candidate score B to create a total candidate score; and program instructions to identify the particular translation as being the first label in the second language based on the total candidate score of the particular translation exceeding a predefined value.

15. The computer system according to claim 14, further comprising:
- program instructions to retrieve extracted text data from the first section, wherein the extracted text data include labels, text, and help information presented in the first section;
- program instructions to match the extracted text data to multiple peripheral terms that describe the particular executable format icon; and
- program instructions to determine that the particular executable format icon is from the first area category based on a quantity of the extracted text data matching the multiple peripheral terms at a predefined quantity, wherein the extracted text data and the peripheral terms are in the first language.

16. The computer system according to claim 14, further comprising:
- program instructions to compare a displayed size and orientation of the particular executable format icon in the first section to multiple other icons;
- program instructions to determine that the particular executable format icon and the multiple other icons are a same size;
- program instructions to, in response to determining that the particular executable format icon and the multiple other icons are a same size, determine that the particular executable format and the multiple other icons are of a predefined quantity of icons; and
- program instructions to, in response to determining that the particular executable format and the multiple other icons are of the predefined quantity of icons, assign the particular executable format and the multiple other icons to the first area category.

17. The computer system according to claim 14, further comprising:
- program instructions to determine a physical distance between two input icons as displayed on the GUI; and
- program instructions to, in response to determining that the physical distance between the two input icons on the GUI is less than a predetermined distance, assign the two input icons to the first area category.

18. The computer system according to claim 14, wherein the first language is a letter-based language and the second language is a logographic based language.

19. The computer system according to claim 14, wherein executing the particular executable format icon causes a computer to perform a first function, wherein executing the particular executable page moving icon causes the computer to perform a second function, and wherein the first function and the second function are different functions.

* * * * *